United States Patent [19]
Nishida et al.

[11] Patent Number: 5,825,801
[45] Date of Patent: Oct. 20, 1998

[54] LASER APPARATUS

[75] Inventors: Satoshi Nishida; Shigeto Takeshima, both of Tokyo, Japan

[73] Assignee: Mitsubishi Denki Kabushiki Kaisha, Tokyo, Japan

[21] Appl. No.: 806,543

[22] Filed: Feb. 24, 1997

[30] Foreign Application Priority Data

Aug. 21, 1996 [JP] Japan .................................. 8-219946

[51] Int. Cl.⁶ ............................... H01S 3/08; G02B 5/08; B23K 26/00
[52] U.S. Cl. .................................. 372/99; 372/9; 372/19; 372/29; 372/92; 372/107; 372/108; 372/109; 359/846; 219/121.6; 219/121.61
[58] Field of Search .................................. 372/9, 18, 19, 372/25, 29, 30, 31, 40, 69, 72, 92, 99, 108, 109, 107; 359/846, 868; 219/121.6, 121.61, 121.62, 121.67, 121.68, 121.7, 121.74, 121.75, 121.82

[56] References Cited

U.S. PATENT DOCUMENTS

| | | | |
|---|---|---|---|
| 4,951,285 | 8/1990 | Cole et al. | 372/19 |
| 5,058,123 | 10/1991 | Yasui et al. | 372/99 |
| 5,060,231 | 10/1991 | Hollins et al. | 372/71 |
| 5,091,801 | 2/1992 | Ebstein | 359/665 |
| 5,260,964 | 11/1993 | Morin et al. | 372/95 |
| 5,359,616 | 10/1994 | Yasui et al. | 372/39 |
| 5,506,858 | 4/1996 | Takenaka et al. | 372/92 |
| 5,699,376 | 12/1997 | Richmond | 372/68 |

FOREIGN PATENT DOCUMENTS

| | | | |
|---|---|---|---|
| 61-78183 | 4/1986 | Japan | 372/99 X |
| 62-165985 | 7/1987 | Japan | 372/99 X |
| 62-232984 | 10/1987 | Japan | 372/99 X |
| 63-140587 | 6/1988 | Japan | 372/99 X |
| 2-174283 | 7/1990 | Japan | 372/99 X |
| 2-302083 | 12/1990 | Japan | 372/99 X |
| 6-218565 | 8/1994 | Japan | 372/99 X |
| 7-246488 | 9/1995 | Japan | 372/99 X |

*Primary Examiner*—Brian Healy
*Attorney, Agent, or Firm*—Sughrue, Mion, Zinn, Macpeak & Seas, PLLC

[57] ABSTRACT

The laser apparatus according to the present invention comprises an output mirror for reflecting a portion of a laser beam and transmitting therethrough a remaining thereof; a full reflection mirror located at a position opposite to this output mirror for completely reflecting a laser beam and changing the curvature; a laser medium provided between the output mirror and the full reflection mirror for causing induced emission; an aperture means for deciding a beam mode of a laser beam generated between the output mirror and the full reflection mirror and changing the aperture diameter; and a converging means for converging an outgoing laser beam from the output mirror and changing a distance from the output mirror according to a machining path; and the laser apparatus changes a curvature of the full reflection mirror and also changes a diameter of the aperture means.

29 Claims, 27 Drawing Sheets

Z=1 INDICATES FOCAL POSITION AT NEAR POINT $\omega_1 \neq \omega_1'$

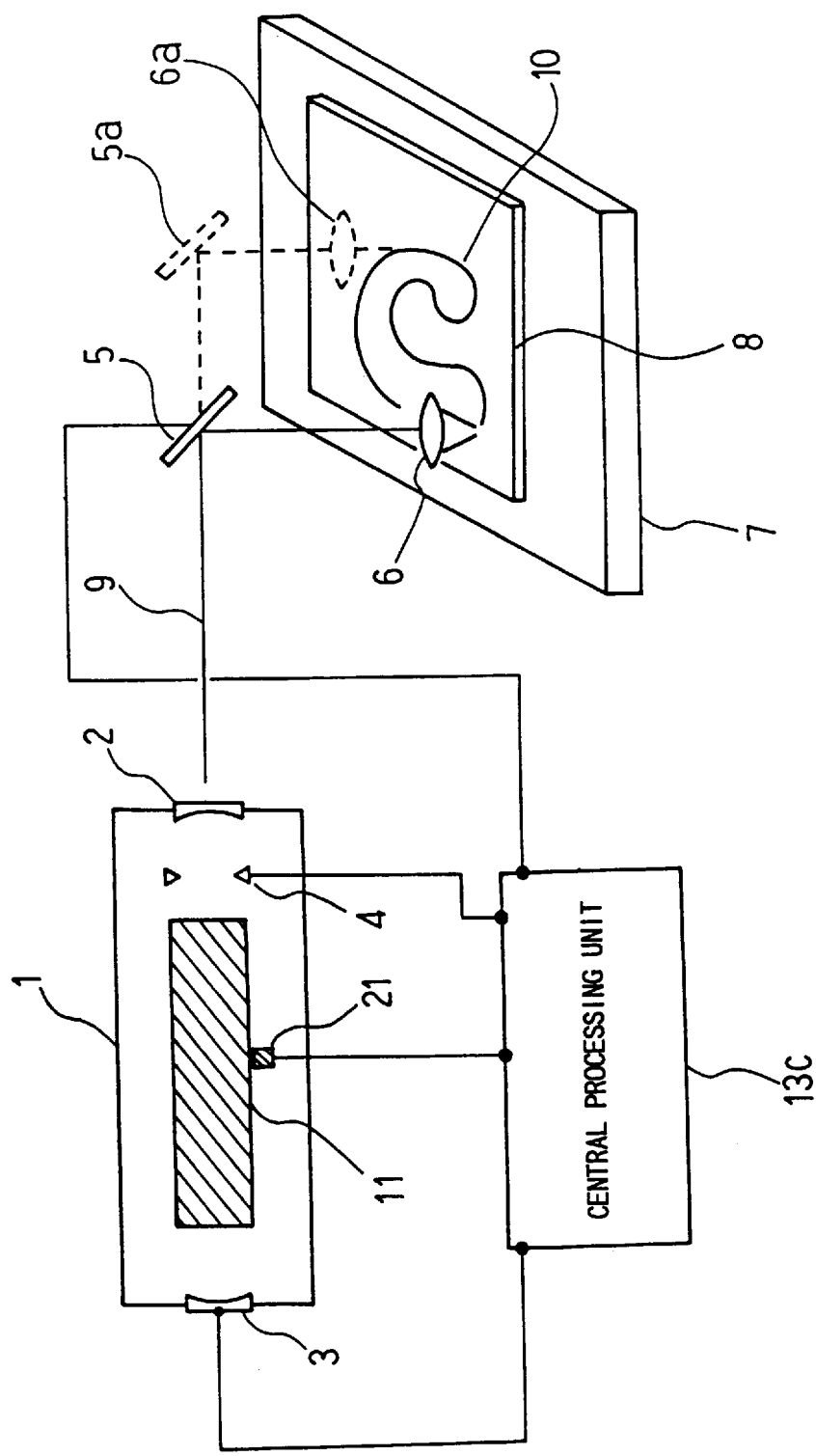

$\omega_1 \neq \omega_1'$

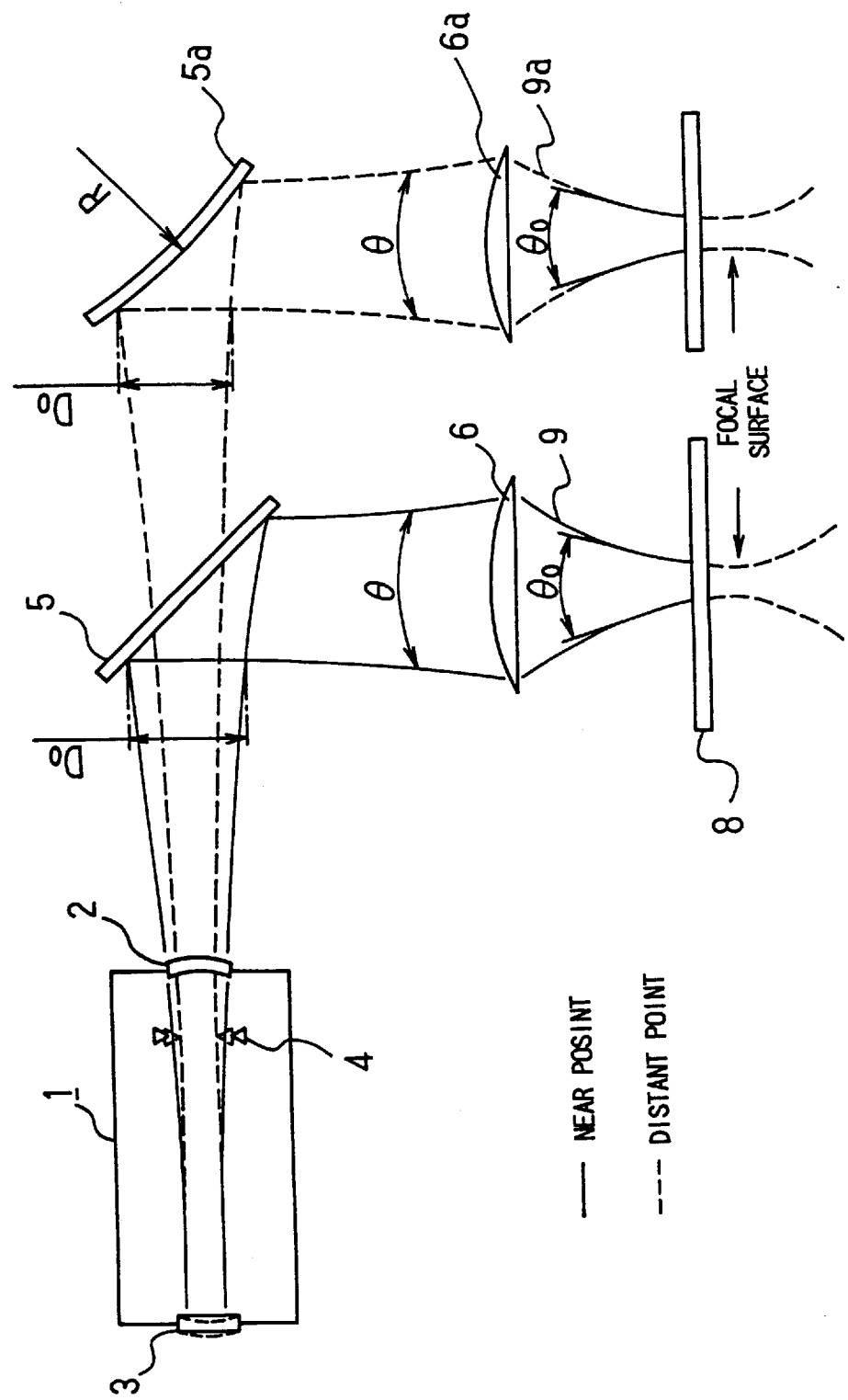

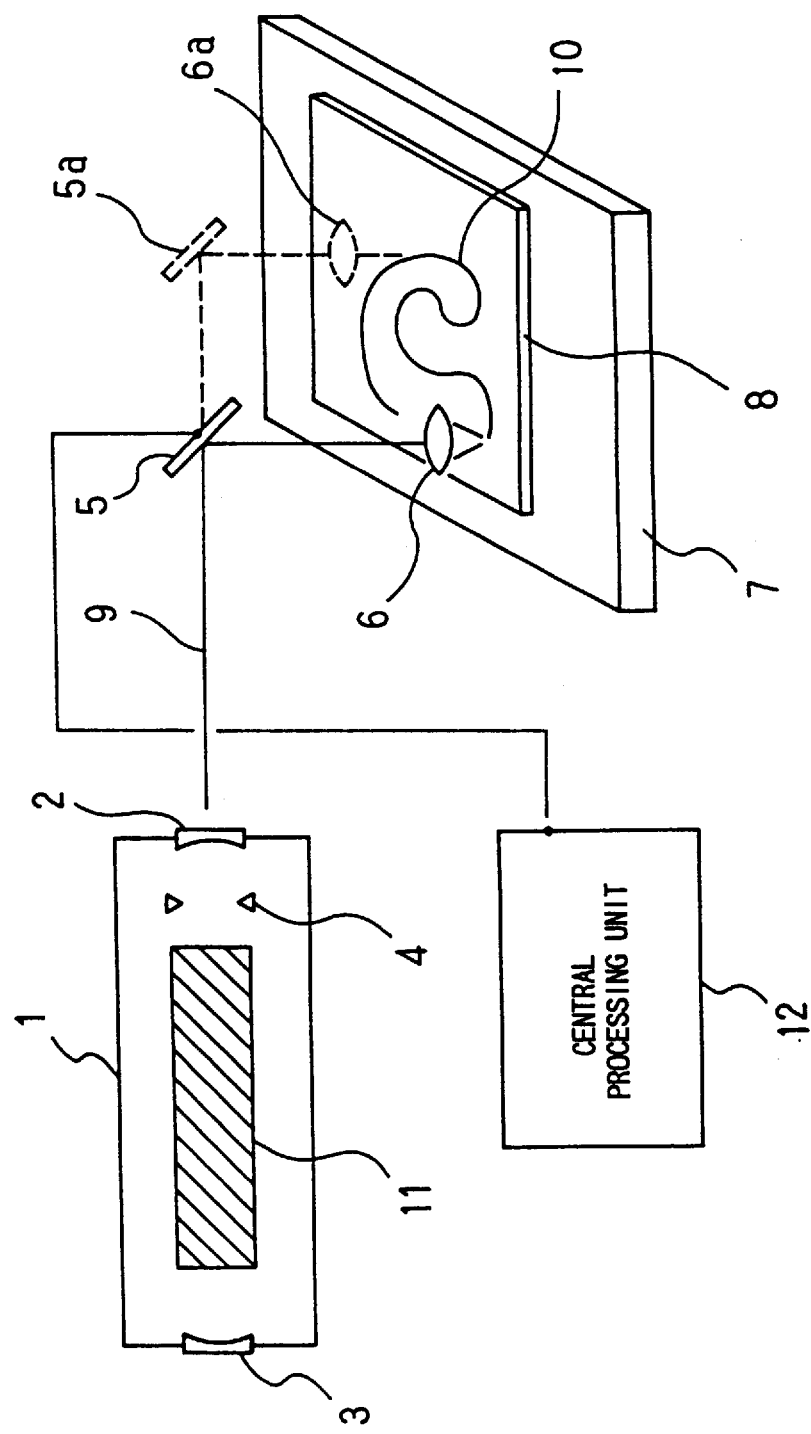

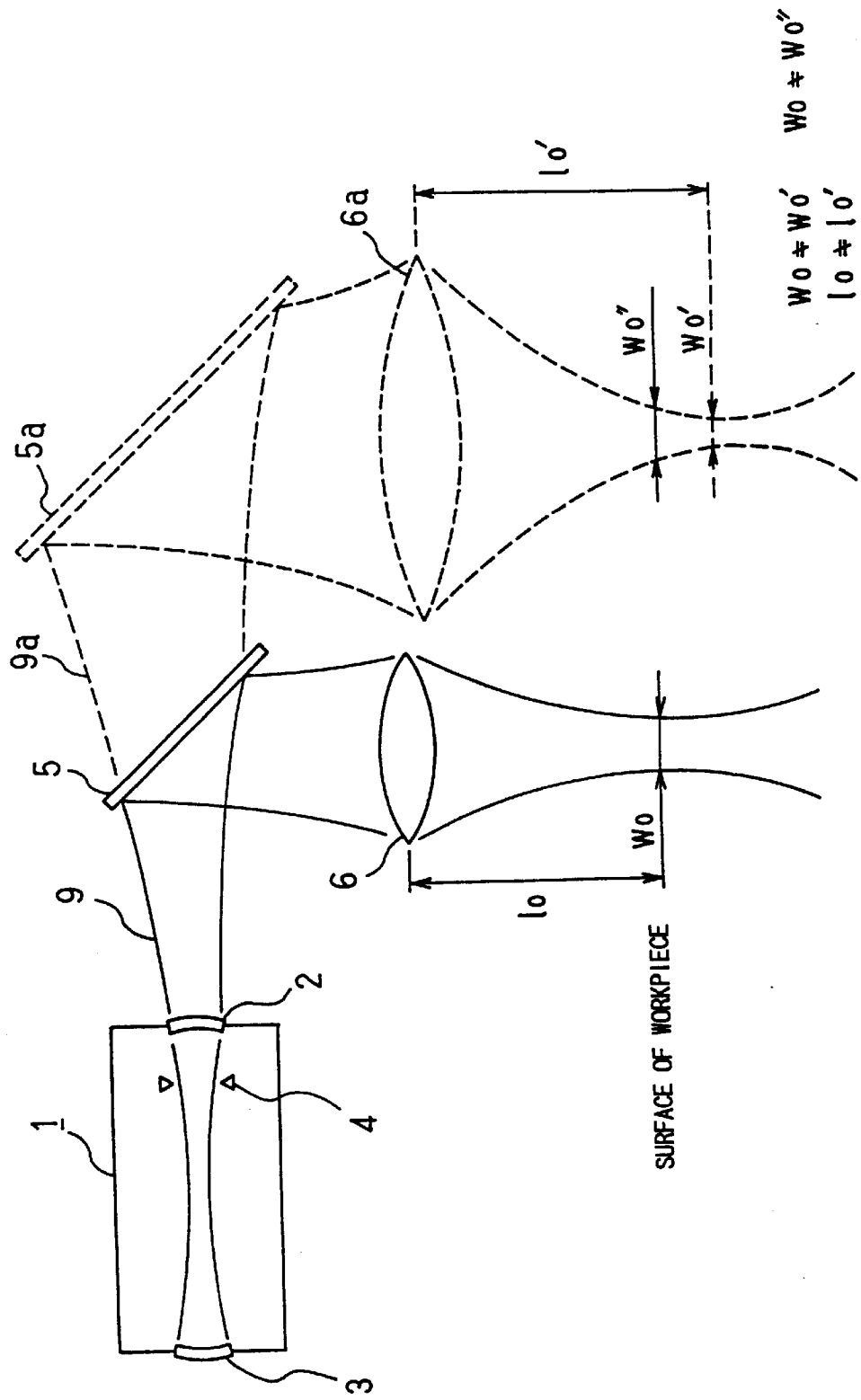

LASER APPARATUS

FIELD OF THE INVENTION

The present invention provides a laser apparatus enabling machining and measurement with stability.

BACKGROUND OF THE INVENTION

FIG. 29 is a view showing configuration of a conventional type of laser beam machining device based on an optically scanning system.

In the figure, designated at the reference numeral 1 is a laser oscillator, at 2 an output mirror located at the laser oscillator 1, at 3 a full reflection mirror located at the laser oscillator 1, at 4 an aperture means provided between the output mirror 2 and the full reflection mirror 3 and set to a specified hole diameter, at 5 and 5a a reflection mirror for guiding a laser beam obtained from the laser oscillator 1 respectively, at 6 and 6a a converging means for converging a laser beam guided by the reflection mirror 5, at 7 a table, at 8 a workpiece, at 9 a laser beam, at 10 a machining path, at 11 a laser medium, and at 12 a central processing unit for controlling the laser oscillator 1, a movement of the table 7, and positions of the reflection mirror 5 and converging means 6 each in the light path.

Next description is made for operations. The laser medium 11 is a mixed gas including $CO_2$ in a carbon-dioxide laser oscillator, and a crystal such as YAG or the like when used in a solid laser. Description is made herein for a case where a carbon dioxide laser is used. When molecules of $CO_2$ in the laser medium 11 are excited by means of, for instance, electric discharging, irradiation of light or the like, light is emitted. When the output mirror 2 and the full reflection mirror 3 are located at positions each facing the laser medium, light is repeatedly reflected between the output mirror 2 and the full reflection mirror 3, and the light passes through the laser medium, whereby induced emission is generated. The laser beam is amplified and radiated by means of this induced emission and the beam going around between the output mirror 2 and the full reflection mirror 3. The output mirror 2 has the characteristics that it reflects a portion of the laser beam and transmits the remaining portion therethrough, so that the transmitted beam is taken out to outside as a laser beam 9, and the reflected beam is used for further amplification. The aperture means 4 has a function for deciding a form (a mode degree (converging characteristic)) of a beam mode generated between the output mirror 2 and the full reflection mirror 3.

The laser beam machining device guides the laser beam 9 taken out as described above to the converging means 6 with the reflection mirror 5. The converging means 6 has the effect for making a laser beam 9 smaller or larger to a specified size. By irradiating the converged laser beam 9 by the converging means 6 to the workpiece 8 placed on the table 7, performance such as cutting and measurement can be executed. In a case of the device based on an optically scanning system, the table 7 is fixed, and light is moved. As a method of moving the light, there is a method in which the reflection mirror 5 and the converging means 6 are moved to a reflection mirror 5a and a converging means 6a respectively, whereby the workpiece can be cut out to a form like the machining path 10 or the like. A series of these operations are executed under control provided by the central processing device.

A laser beam obtained from the laser oscillator can not generally be obtained as a parallel beam, and is diverged (or is converged and then goes onto the divergence) according to the Huygens' principle. In a system of moving light like that in an example based on the conventional technology, a distance from the output mirror 2 to the converging means 6 is changed, so that a diameter of the incoming laser beam to the converging means 6 or a divergence angle thereof is different, and for this reason, a cutting path 10 obtained by changing a diameter of a converged light spot $\omega_0$ or a converged position $l_0$ to that like $\omega_0'$ or $l_0'$ as shown in FIG. 30 causes the machining to be unstable.

SUMMARY OF THE INVENTION

It is an object of the present invention to provide a laser apparatus which can stabilize the converging characteristics of a laser beam and is excellent and stable in cutting and measuring precision.

The laser apparatus according to the present invention comprises an output mirror for reflecting a portion of a laser beam and transmitting therethrough a remaining thereof; a full reflection mirror located at a position opposite to this output mirror for completely reflecting a laser beam and changing the curvature; a laser medium provided between the output mirror and the full reflection mirror for causing induced emission; an aperture means for deciding a beam mode of a laser beam generated between the output mirror and the full reflection mirror and changing the aperture diameter; and a converging means for converging an outgoing laser beam from the output mirror and changing a distance from the output mirror according to a machining path; and the laser apparatus changes a curvature of the full reflection mirror and also changes a diameter of the aperture means, so that a constant mode degree as well as a constant beam diameter can be obtained in the entire cutting path along which a length of light path is changed, and for this reason stable machining can effectively be executed.

The laser apparatus according to the present invention comprises an output mirror for reflecting a portion of a laser beam and transmitting therethrough a remaining thereof, said the output mirror having an absorption factor detecting means; a full reflection mirror located at a position opposite to this output mirror for completely reflecting a laser beam and changing the curvature; a laser medium provided between the output mirror and the full reflection mirror for causing induced emission; an aperture means for deciding a beam mode of a laser beam generated between the output mirror and the full reflection mirror and changing the aperture diameter; and a converging means for converging an outgoing laser beam from the output mirror; and the laser apparatus changes a curvature of the full reflection mirror and also changes a diameter of the aperture means according to change of an absorption factor in the output mirror, so that, even if the output mirror is degraded, constant beam characteristics can be obtained, and for this reason stable machining can effectively be executed.

The laser apparatus according to the present invention comprises an output mirror for reflecting a portion of a laser beam and transmitting therethrough a remaining thereof; a full reflection mirror located at a position opposite to this output mirror for completely reflecting a laser beam and changing the curvature; a laser medium provided between the output mirror and the full reflection mirror for causing induced emission; an aperture means for deciding a beam mode of a laser beam generated between the output mirror and the full reflection mirror and changing the aperture diameter; and a converging means for converging an outgoing laser beam from the output mirror, said converging means having an absorption factor detecting means; and the laser apparatus changes a curvature of the full reflection mirror and also changes a diameter of the aperture means according to change of an absorption factor in the converging means, so that, even if the converging means is degraded, constant beam characteristics can be obtained, and for this reason stable machining can effectively be executed.

The laser apparatus according to the present invention comprises an output mirror for reflecting a portion of a laser beam and transmitting therethrough a remaining thereof; a full reflection mirror located at a position opposite to this output mirror for completely reflecting a laser beam and changing the curvature; a laser medium provided between the output mirror and the full reflection mirror for causing induced emission, said laser medium having a temperature detecting means; an aperture means for deciding a beam mode of a laser beam generated between the output mirror and the full reflection mirror and changing the aperture diameter; and a converging means for converging an outgoing laser beam from the output mirror; and the laser apparatus changes a curvature of the full reflection mirror and also changes a diameter of the aperture means according to change of temperature in the laser medium, so that, even if the laser medium is degraded, constant beam characteristics can be obtained, and for this reason stable machining can effectively be executed.

The laser apparatus according to the present invention sets a curvature of the full reflection mirror and a diameter of the aperture means so that a diameter of a beam incoming into the converging means is kept constant, so that, even if a length of light path is changed or any of the components constituting the system is degraded, a constant converging spot size of the beam can be obtained, and for this reason stable machining can effectively be realized.

The laser apparatus according to the present invention sets a curvature of the full reflection mirror and a diameter of the aperture means so that the converging characteristics in the beam mode is kept constant, so that, even if a length of light path is changed or any of the components constituting the system is degraded, a constant converging spot size of the beam can be obtained, and for this reason stable machining can effectively be realized.

The laser apparatus according to the present invention comprises an output mirror for reflecting a portion of a laser beam and transmitting therethrough a remaining thereof; a full reflection mirror located at a position opposite to this output mirror for completely reflecting a laser beam and changing the curvature; a laser medium provided between the output mirror and the full reflection mirror for causing induced emission; an aperture means for deciding a beam mode of a laser beam generated between the output mirror and the full reflection mirror and changing the aperture diameter; a converging means for converging an outgoing laser beam from the output mirror and changing a distance from the output mirror according to a machining path; and a converging characteristics detecting means provided between the converging means and the output mirror; and the laser apparatus changes a curvature of the full reflection mirror and also changes a diameter of the aperture means according to an output from this converging characteristics detecting means, so that the laser oscillator is controlled so that substantially the same converging characteristics can be obtained by detecting converging characteristics in all the cutting path along which a length of light path is changed, and for this reason stable machining can effectively be executed.

The laser apparatus according to the present invention can freely change a curvature of the full reflection mirror to a required one according to a fluid pressure, a flow rate of which is controlled by a pressure sensor, so that stable machining can effectively be realized.

The laser apparatus according to the present invention controls a signal from the pressure sensor according to an input from outside, so that a fluid pressure loaded to the full reflection mirror can be controlled and a curvature of the full reflection mirror to be changed can be decided according to a signal from an input from outside such as an absorption factor in the output mirror or a distance between the output mirror and the converging means or the like. The laser apparatus provides a light path pipe in a light path between the output mirror and the converging means in a case where a fluid for changing a curvature of the full reflection mirror is a gas not absorbing a laser beam, and the fluid is flown through the light path, so that a pressure medium can effectively be utilized, and for this reason it is possible to provide a low cost laser apparatus with a low running cost.

The laser apparatus according to the present invention comprises an output mirror for reflecting a portion of a laser beam and transmitting therethrough a remaining thereof; a full reflection mirror located at a position opposite to this output mirror for completely reflecting a laser beam and a laser medium provided between the output mirror and the full reflection mirror for causing induced emission; and in the laser apparatus for going out a laser beam from the output mirror, a transmission mirror is located so that the laser beam goes through it immediately after the laser beam goes out from the output mirror and a means for changing a curvature of the transmission mirror is provided therein, so that different beam characteristics can be realized at a given position, and for this reason it is possible to provide a laser apparatus enabling various types of machining.

In the laser apparatus according to the present invention, the transmission mirror is made from a material with the thickness thinner or the Young's modulus smaller than that of the output mirror, and the means for changing a curvature of the transmission mirror gives a fluid pressure to a laser beam outgoing side of the output mirror as well as to a laser beam incoming side of the transmission mirror, so that a curvature of the transmission mirror can be changed to a required one, and also the propagating characteristics of a beam can be changed as required.

The laser apparatus according to the present invention comprises an output mirror for reflecting a portion of a laser beam and transmitting therethrough a remaining thereof; a full reflection mirror located at a position opposite to this output mirror for completely reflecting a laser beam; and a laser medium provided between the output mirror and the full reflection mirror for causing induced emission; and in the laser apparatus for going out a laser beam from the output mirror, a transmission mirror is located so that the laser beam goes through it immediately after the laser beam goes out from the output mirror and a means for changing a curvature of the output mirror is provided therein, so that different beam characteristics can be realized at a given position, and for this reason it is possible to provide a laser apparatus enabling various types of machining.

The laser apparatus according to the present invention comprises an aperture means for deciding a beam mode of a laser beam generated between the output mirror and the full reflection mirror and changing the aperture diameter, and changes a curvature of the output mirror and also changes a diameter of the aperture means, so that different beam characteristics can be realized at a given position, and for this reason it is possible to provide a laser apparatus enabling various types of machining.

The laser apparatus according to the present invention controls a flow rate of a fluid with a pressure sensor and gives a fluid pressure to the output mirror, so that a curvature of the output mirror can be changed as required, and for this reason the propagating characteristics of a beam can be changed.

In the laser apparatus according to the present invention comprising an output mirror for reflecting a portion of a laser beam and transmitting therethrough a remaining thereof; a full reflection mirror located at a position opposite to this output mirror for completely reflecting a laser beam; a laser medium provided between the output mirror and the full reflection mirror for causing induced emission; and a converging means for converging an outgoing laser beam from the output mirror and changing a distance from the output mirror according to a machining path; a transmission mirror is located so that the laser beam goes through it immediately after the laser beam goes out from the output mirror and a means for changing a curvature of the output mirror is provided therein, so that constant beam characteristics can be obtained even if any of the components constituting the system (an output mirror, a converging means, a laser medium or the like) is degraded or a length of light path is changed, and for this reason stable machining can effectively be executed.

In the laser apparatus according to the present invention, the transmission mirror is made from a material with the thickness thinner or the Young's modulus smaller than that of the output mirror, and the means for changing a curvature of the transmission mirror gives a fluid pressure to a laser beam outgoing side of the output mirror as well as to a laser beam incoming side of the transmission mirror, so that a curvature of the transmission mirror can freely be changed to a required one.

The laser apparatus according to the present invention provides a light path pipe in a light path between the output mirror and the converging means, and in a case where a fluid is a gas not absorbing a laser beam, the fluid for changing a curvature of the output mirror is flown through the light path, so that a pressure medium can effectively be utilized, and for this reason it is possible to provide a low cost laser apparatus with a low running cost.

The laser apparatus according to the present invention comprises an output mirror for reflecting a portion of a laser beam and transmitting therethrough a remaining thereof; a full reflection mirror located at a position opposite to this output mirror for completely reflecting a laser beam and changing the curvature; a laser medium provided between the output mirror and the full reflection mirror for causing induced emission; a converging means for converging an outgoing laser beam from the output mirror to a workpiece; and a means for changing a distance between the converging means and the workpiece, so that a size of a laser beam irradiated to the workpiece is set so that the size thereof can be kept constant, and for this reason stable machining can effectively be realized.

The laser apparatus according to the present invention changes a distance between the converging means and the workpiece according to the absorption factor detecting means provided in the output mirror or in the converging means as well as to an output from this absorption factor detecting means, so that if a spot size of the laser beam irradiated to the workpiece is controlled so that the size thereof will be kept constant even if the propagating characteristics is changed due to degradation of the optical system, it is possible to provide a laser apparatus enabling stable machining.

The laser apparatus according to the present invention changes a distance between the converging means and the workpiece according to the converging characteristics detecting means provided between the output mirror and the converging means as well as to an output from this converging characteristics detecting means, so that if a spot size of the laser beam irradiated to the workpiece is controlled so that the size thereof will be kept constant, the machining can be stabilized even if external factors such as change of a length of light path or a heat lens of the output mirror or the like are changed.

The laser apparatus according to the present invention comprises a reflection mirror for reflecting a laser beam; and a converging means for converging the reflected laser beam, and changes a curvature of the reflection mirror, so that all the parameters of a laser beam incoming into the converging means are set so that the parameters will be kept substantially constant, and for this reason it is possible to realize stable machining in accordance with various types of change.

Other objects and features of this invention will become understood from the following description with reference to the accompanying drawings.

BRIEF DESCRIPTION OF THE DRAWINGS

FIG. 13 is a view showing configuration of a laser apparatus according to Embodiment 4 of the present invention;

FIG. 28 is a simulated view showing propagation of a beam from the laser apparatus shown in FIG. 15;

FIG. 29 is a view showing configuration of a laser apparatus based on the conventional technology; and FIG. 30 is a simulated view showing propagation of a beam from the laser apparatus based on the conventional technology.

DESCRIPTION OF THE PREFERRED EMBODIMENTS

Description is made for embodiments of the present invention with reference to the related drawings.

Figure 1:
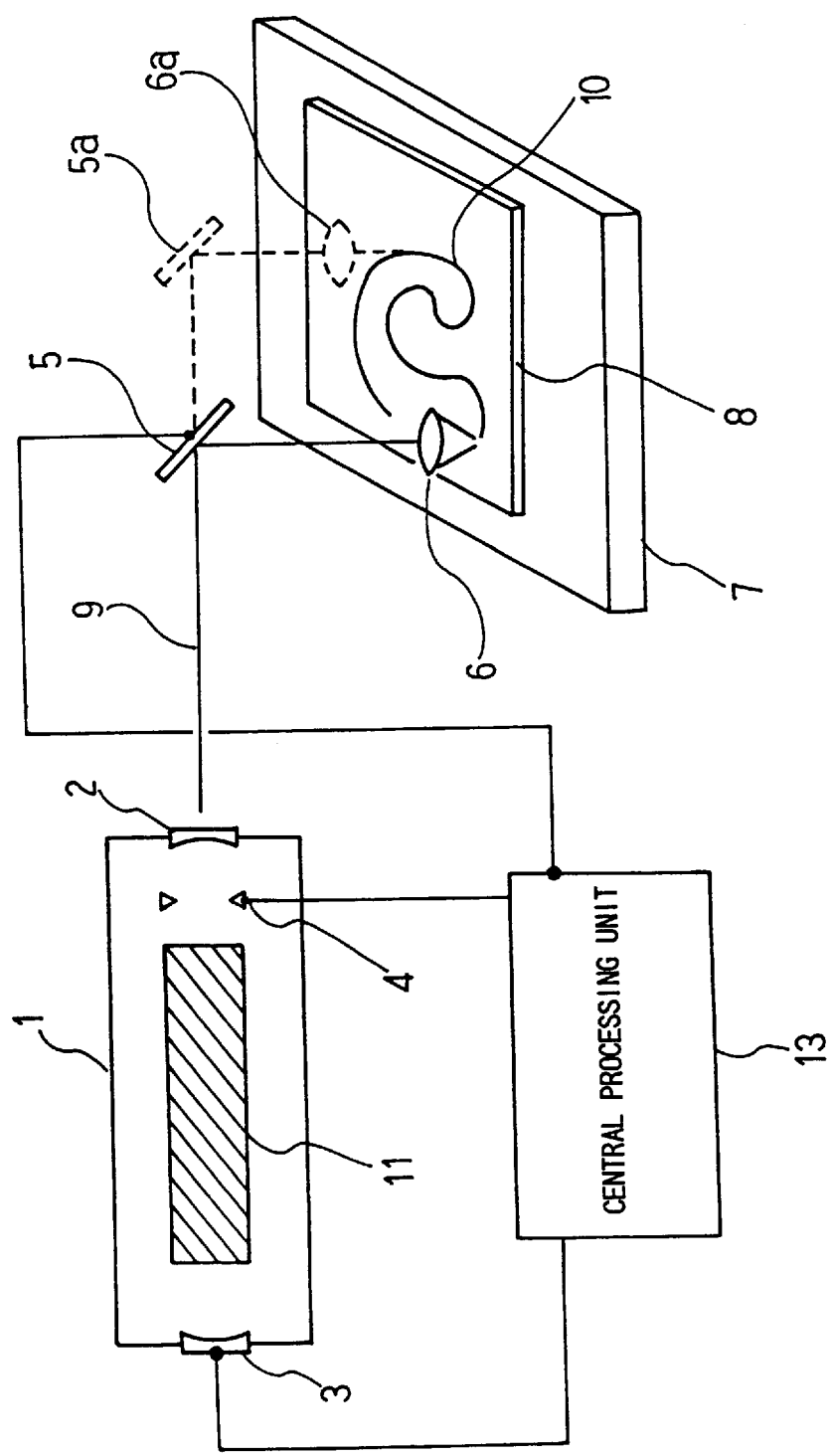
FIG. 1 is a view showing configuration of a laser apparatus according to Embodiment 1 of the present invention.

FIG. 1 is a view showing configuration of a laser apparatus according to Embodiment 1 of the present invention. The same reference numerals are assigned to the sections in the figure corresponding to those in the laser apparatus based on the conventional technology, so that description thereof is omitted herein. The reference numeral 13 indicates a central processing unit for providing controls for operations of a laser oscillator 1, movement of light path system, and driving control of a table, transmitting a control signal to a full reflection mirror 3 as well as to an aperture means 4, and also changing a curvature of the full reflection mirror 3 and a diameter of the aperture means 4.

Figure 2:
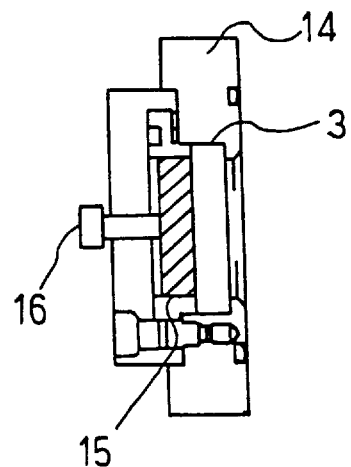
FIG. 2 is a construction view in which a curvature of a full reflection mirror is changed.

FIG. 2 shows a construction for changing a curvature of a typical full reflection mirror disclosed in Japanese Patent Laid-Open Publication No. HEI 2-302083. In the figure, designated at the reference numeral 14 is a mirror holder, at 15 a convex plate, and at 16 a PZT or a micrometer or the like which expands according to a signal from outside and generates a driving force.

Figure 3:
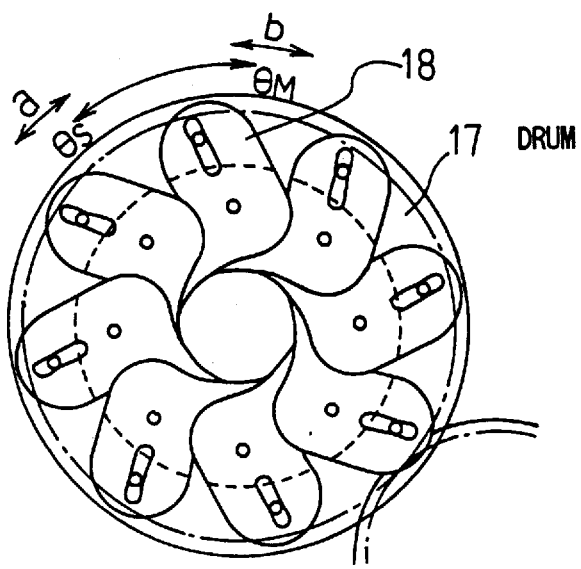
FIG. 3 is a construction view in which a diameter of an aperture means in the laser apparatus shown in FIG. 1 is changed.

FIG. 3 shows a mechanism for changing a diameter of an aperture means disclosed in Japanese Patent Laid-Open Publication No. HEI 2-174283. In the figure, designated at the reference numeral 17 is a drum, and at 18 a blade. A more specific method of changing an aperture is disclosed in the publication described above.

Figure 4:
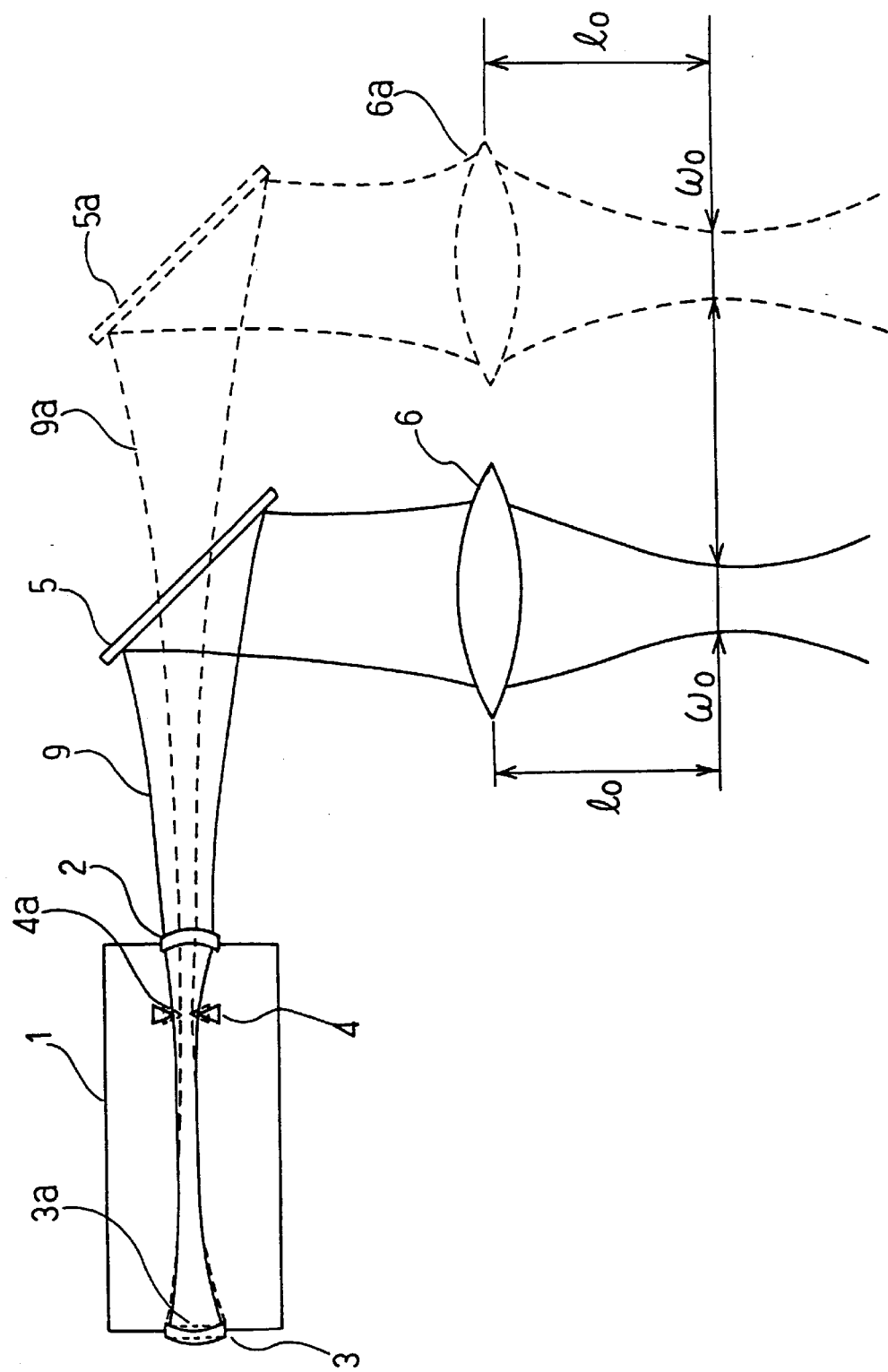
FIG. 4 is a simulated view showing propagation of a beam from the laser apparatus shown in FIG. 1.

Next, a description is made for operations. A reflection mirror 5 has to be moved to, for instance, a position of a reflection mirror 5a to cut a form like a machining path 10 in a workpiece 8 with a laser beam 9 radiated from the laser oscillator 1. In this case, the beam characteristics incoming to a converging means 6 as shown in FIG. 30 was changed because relation of a distance between an output mirror 2 and the converging means 6 is different. And for this reason, a curvature of the full reflection mirror 3 is changed by expanding or shrinking the PZT 16 and pressuring the convex mirror 15 by a volume computed by the central processing unit 13 or by a numerical value stored thereby according to this distance. The propagation characteristics of a beam is changed as shown in FIG. 4 by means of changing a curvature of the full reflection mirror 3, so that it is possible to obtain the same beam characteristics (a diameter of an incoming beam and a mode degree (converging characteristic)) at a position of the converging means 6.

When the curvature of the full reflection mirror 3 is changed, the beam characteristics generated inside the laser oscillator 1 are simultaneously changed, and for this reason, a relation between a diameter $\phi$ of an aperture at a position of the aperture means 4 and a radius $\omega$ of a beam in a single mode is changed.

Accordingly, the central processing unit 13 sends a signal to the aperture means 4 according to a changed volume of the curvature of the full reflection mirror 3 to set a value of $\phi/\omega$ to a constant value for rotating the drum 17, so that the blades 18 move, which make the diameter of the aperture changed. With these controls described above, as shown in FIG. 4, a curvature of the full reflection mirror at a point furthest therefrom (a distant point) is made to that indicated by the reference numeral 3a (a dotted line), and a laser beam 9a propagates as indicated by the dotted line when the diameter of the aperture is set to that indicated by the reference numeral 4a. At a place nearest thereto (a near point), the reflection mirror is set at a place indicated by the reference numeral 5 (a solid line) and the aperture is set at a place indicated by the reference numeral 4 (a solid line), so that the laser beam 9 propagates as indicated by the solid line. With these changes described above, even if the reflection mirror is set in the place 5 or 5a, the laser beams 9 and 9a each passing through the converging means 6 show the same propagating characteristics, and there is also shown no change in a position $l_0$ of a converging point nor in a converging diameter $\omega_0$ of the beam. For this reason a constant mode degree and a diameter of a beam can be obtained along the entire cutting path 10, so that a stable cutting can be executed.

Description is made herein for movements of a laser beam when a curvature of the full reflection mirror 3 and a diameter of the aperture means 4 are changed. When a radius $R_1$ of a curvature of the output mirror 2 and a radius $R_2$ of a curvature of the full reflection mirror 3 are decided, a propagation form of a beam in the single mode (Gaussian type of beam mode) generated inside the resonator (a length L between the output mirror and the full reflection mirror) is defined as shown in FIG. 4. Assuming that a position of a beam waist (a minimum value in a diameter of the beam) generated inside the resonator is $Z_1$ and a $1/e^2$ radius in the single mode at the beam waist is $\omega_1$, $1/e^2$ radius: $\omega(Z)$ at a given position (a distance: Z from $Z_1$) is expressed as follows:

$$\omega(Z) = \omega_1 \{1 + (\lambda Z / \pi \omega_1^2)\}^{1/2}$$

$$Z_1^2 = L(-R_1-L)(R_2-L)(R_2-R_1-L)/(R_2-R_1-2L)^2$$

$$\omega_1 = (\lambda Z_1 / \pi)^{1/2}$$

Assuming that the aperture means 4 is set at position Z, a form of the beam mode obtained from the laser oscillator 1 is decided according to a diameter $\phi$ of the aperture means 4.

Figure 5:
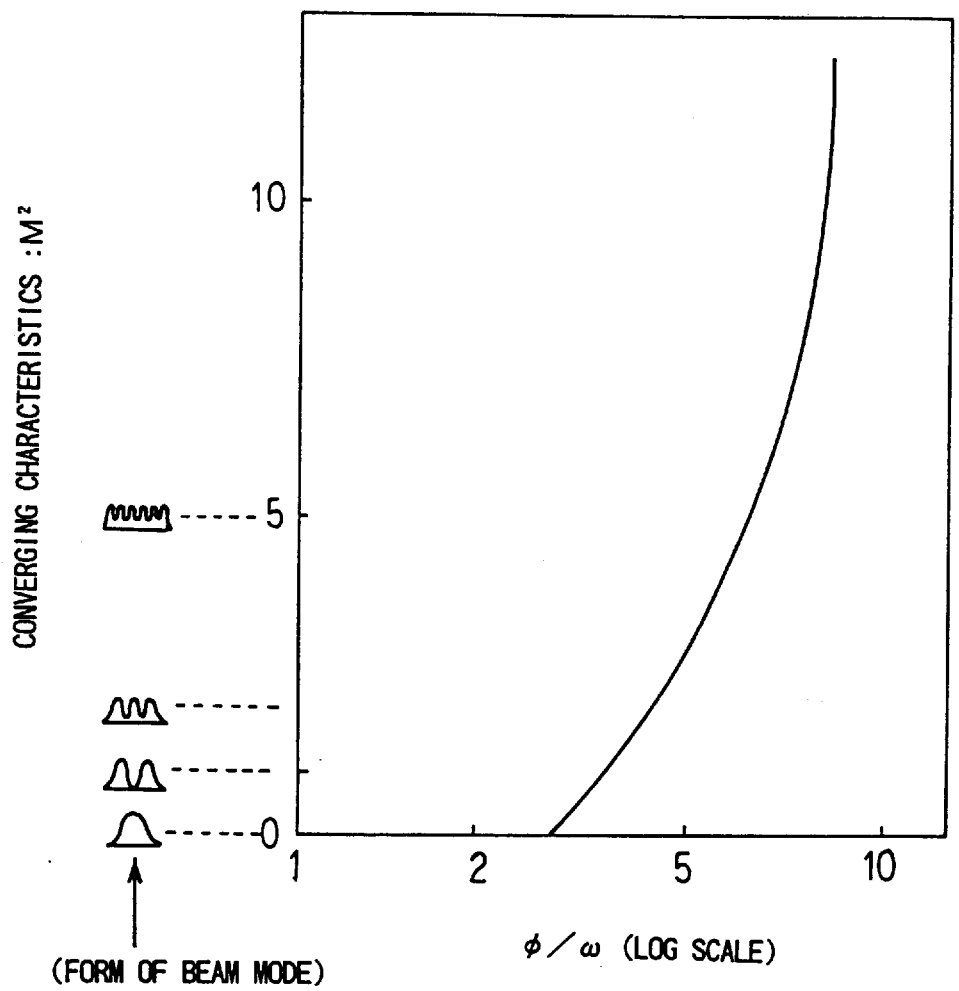
FIG. 5 is an explanatory view showing a relation between $\phi/107$ and converging characteristics.

In the experiment, it was recognized that the converging characteristics $M^2$ and a form of a beam mode according to $\phi(Z)/\omega(Z)$ were changed as shown in FIG. 5. What the converging characteristic $M^2$ means is disclosed in SPIE Vol. 1414 "Laser Beam Diagnostics" (1991).

When the converging characteristic $M^2$ is changed, a diameter $\omega'$ of a laser beam is changed in the relation described below:

$$\omega' = M^2 \cdot \omega$$

to a diameter $\omega$ of a single mode, so that it is obvious that change of the converging characteristic causes change of the propagating characteristics.

In the present invention, stabilized beam characteristics has to be supplied for machining or measurement, so that, it is required to control $\phi/\omega$ to a constant level. When $\phi/\omega$ is set to a constant level, the converging characteristics (a form of a beam mode), one of the beam characteristics, can be set to a constant level. Then the curvature may be changed so that a diameter of the beam at a position of the converging means will be constant.

Figure 6A:
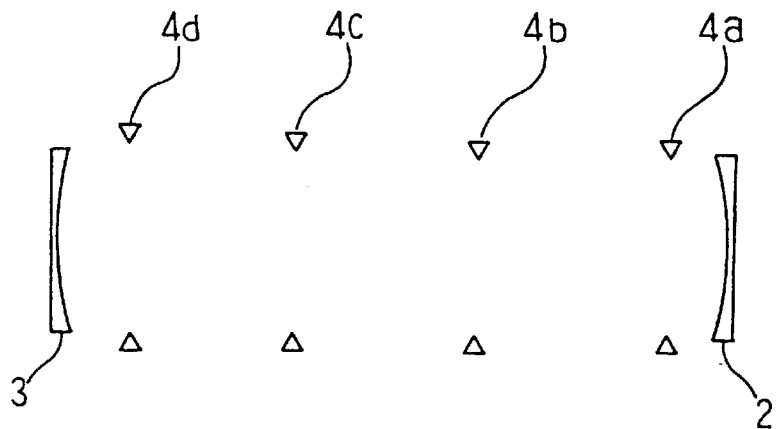
FIGS. 6A to 6B is an explanatory view showing a relation between a change of a curvature of the full reflection mirror and a diameter of a beam mode at a position of the aperture means.
Figure 6B:
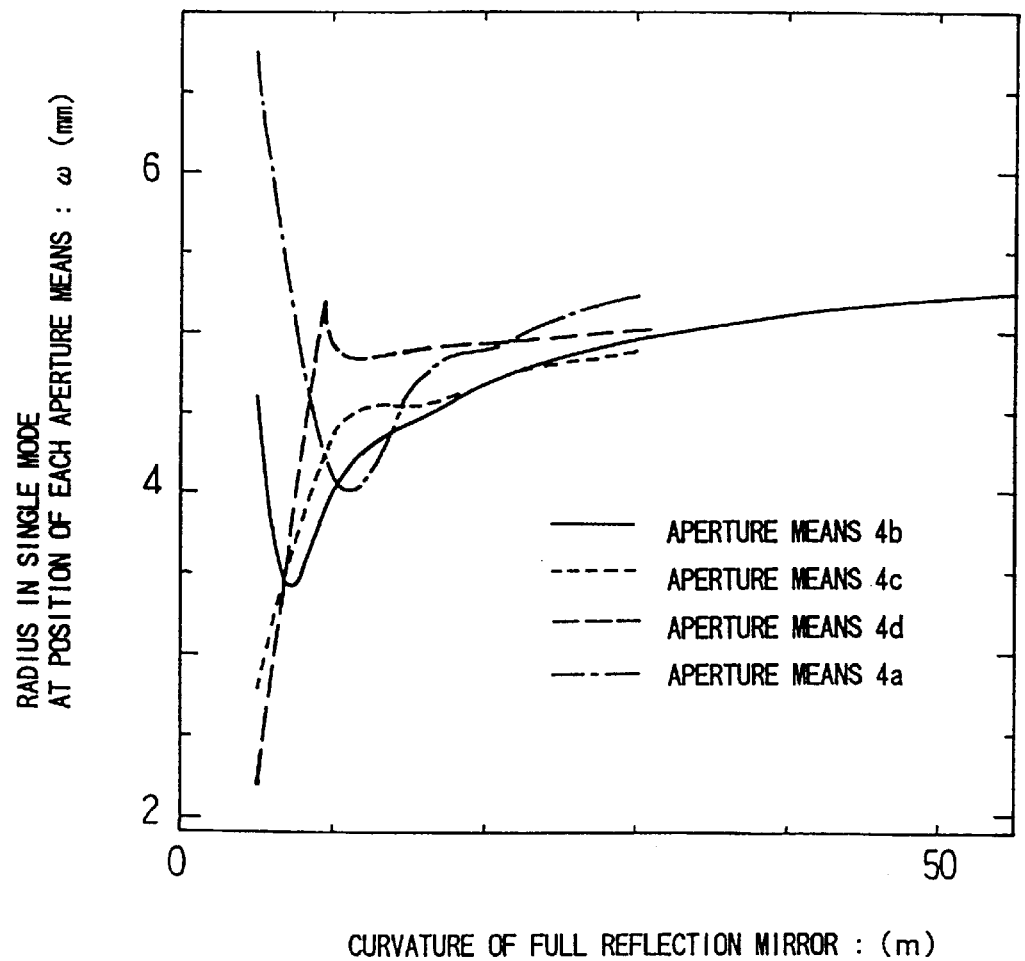

Description is made for how $\omega$ is changed according to the set position of the aperture means with reference to FIGS. 6A to 6B as an example. In this computing step, the changes generated when the aperture means 4 is located at four different positions are compared. In the computing step shown in the figure, it is assumed that a diameter of a curvature of the output mirror 2 is 20 m, a length of the resonator is around 4.7 m, and an aperture means 4a is placed at a position by 4.6 m away from the full reflection mirror 3, an aperture means 4b at a position by 3.1 m, an aperture means 4c at a position by 1.6 m, and an aperture means 4d at a position by 0.2 m. It is clearly understood that a change of a radius $\omega$ in the single mode according to change of the curvature of the full reflection mirror 3 is not a monotonous one, and a value of $\omega$ does not always become larger when the curvature is large, and also that actual change of a value $\omega$ varies according to a place of the aperture means. A diameter of the aperture means to be controlled can not easily be computed, and for this reason there is a case where a device with which numerical values can be computed or a storing device for storing data for diameters each corresponding to a change of the curvature is required. Whether the device enabling computing of numerical values or the storing device is required or not will be decided according to whether linear approximation is possible in an area in which a curvature is changed or not.

A method of changing a curvature of a reflection mirror is disclosed in, for instance, Japanese Patent Laid-Open Publication No. SHO 61-78183, but when a curvature of a reflection mirror is changed like in the disclosure of the publication described above, a mode degree is generally changed. For this reason, even if a diameter of a beam can be matched to the original value, a spot size of a laser beam on an irradiated workpiece varies, so that stable machining can not be executed. By changing a diameter of the aperture in accordance with changing a curvature of the full reflection mirror like the present invention, only the propagating characteristics can be changed without changing the mode degree.

Figure 8:
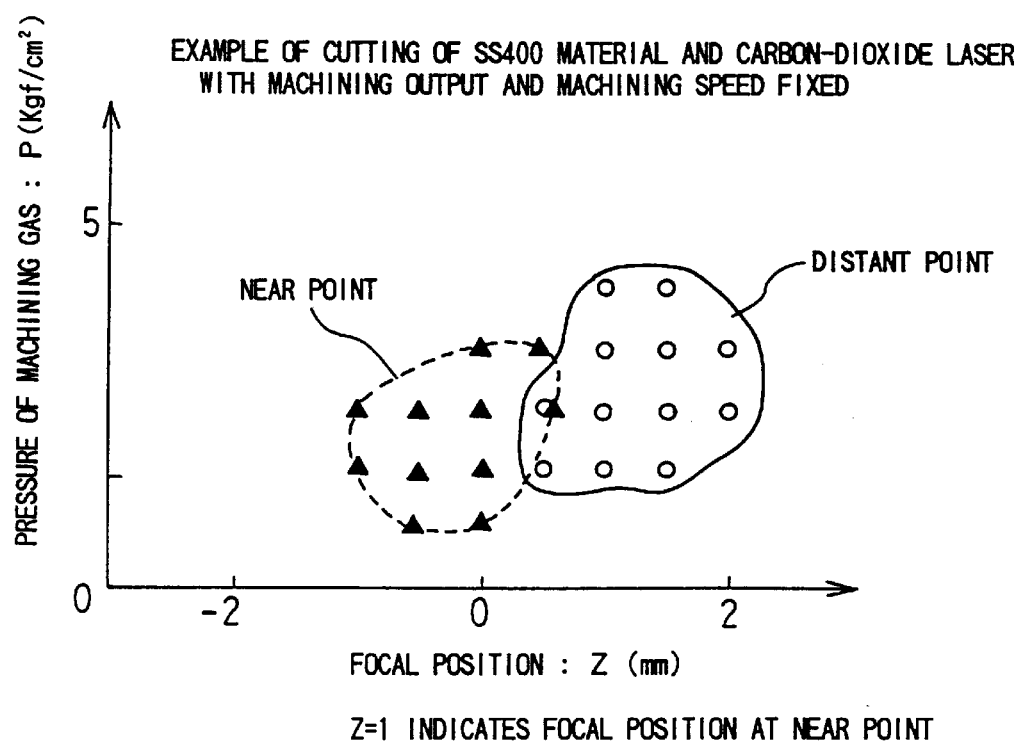
FIG. 8 is a concept view showing change of a machining condition according to change of a length of light path.

In the embodiment described above, there is shown a device in which a diameter of the aperture means and a curvature of the full reflection mirror can be changed with no restriction to steps, but the diameter thereof and the curvature thereof may be changed step by step like the aperture means, for instance, shown in FIG. 3 in Japanese Patent Publication No. SHO 63-17234. In this case, it is preferred that the curvature of the full reflection mirror is also adjusted step by step. Generally a beam diameter allowing machining is limited within a certain range, and in the ordinary hybrid type of machine, change in the distance between the output mirror 2 and the converging means 6 is smaller as compared to that in a machine based on an optically scanning system, so that, even if a beam obtained from the laser oscillator 1 is constant, ranges in which stable machining can be executed are overlapped in a distant point as well as at a near point as shown in FIG. 8. The present invention may not necessarily be used in a machine having such configuration as that machining conditions can sufficiently be overlapped. However, the present invention is extremely effective in a machine having narrow conditions for overlapping or no condition therefor.

In a case where a scanning type of table is used, machining conditions at the distant point and the near point may not always be overlapped. In the case described above, an effect may be expected by providing controls step by step so that the overlapping area will become sufficient. Although it is necessary to provide no-step controls as much as possible because a range in which the overlapping area varies according to an object to be machined, there may be a case where there is no way but to provide step-by-step controls because of the configuration of a machine or cost thereof. Also, the figure shows a position of the aperture means 4 nearer to the output mirror 2, but the same effect can be obtained even if the aperture means is provided at any position between the output mirror 2 and the full reflection mirror 3.

It is conceivable that a stable machining area shown in FIG. 8 is changed because of the following reasons. When a diameter of an incoming beam into the converging means 6 changes, a minimum spot size of the beam changes after it passes through the converging means. If a spot size on an irradiated workpiece varies, naturally a result of machining shows a different phenomenon. And for this reason, in order to realize the identical spot size thereof at a position of the workpiece, a focal position is set to a defocusing state. When it is set to be defocused, a distance between a nozzle and the workpiece is changed, so that the pressure of a machining gas is changed. With the reason described above, there is generated such phenomenon that machining conditions at a distant point and those at a near point are different from each other as shown in FIG. 8.

A distance between the laser oscillator and the converging means may be detected by a distance detecting means or may be read from mechanical coordinates of the NC data.

Figure 7:
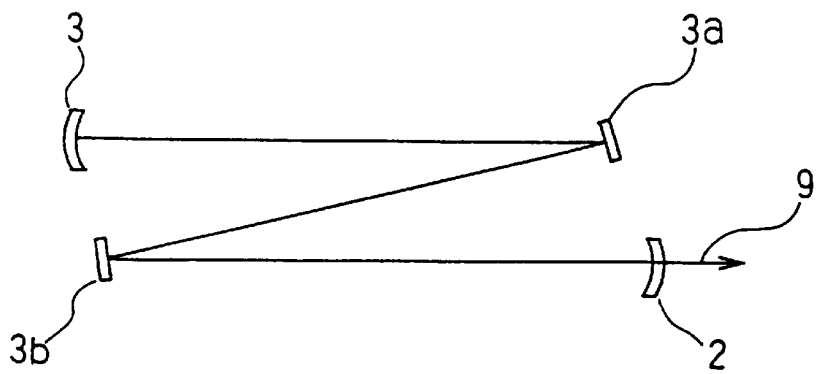
FIG. 7 is a view showing configuration of a Z-type of resonator in the laser apparatus shown in FIG. 1 as an example.

The full reflection mirror 3 for changing a curvature may be, for instance, the reflection mirror 3a or 3b of a Z-type resonator as shown in FIG. 7, and any reflection mirror constituting a resonator may be used.

Figure 9:
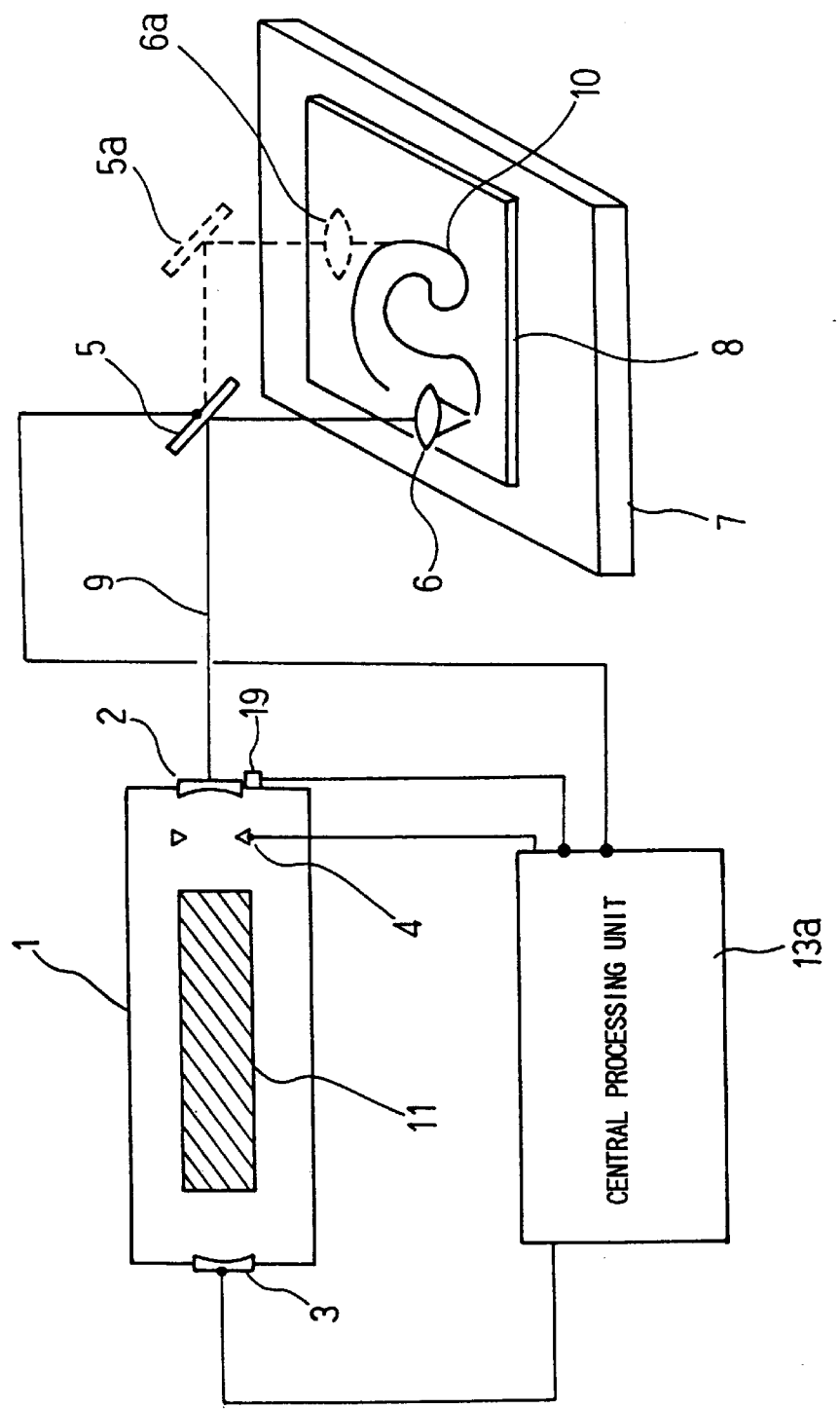
FIG. 9 is a view showing configuration of a laser apparatus according to Embodiment 2 of the present invention.

FIG. 9 is a view showing configuration of a laser apparatus according to Embodiment 2 of the present invention.

In the figure, the reference numeral 19 indicates a temperature detector attached to the output mirror 2. The same reference numerals are assigned to the sections in the figure corresponding to those in Embodiment 1 or in the example based on the conventional technology, so that description thereof is omitted herein.

If the output mirror 2 is used for a long period of time, an absorption factor of the output mirror increases because of deposition of dust or oil mist thereon.

An absorption factor $\alpha$ can be obtained by measuring a temperature on the end face of the output mirror if a diameter D of the output mirror, a thickness t thereof, a specific gravity $\rho$ thereof are known.

$$\alpha = \{C(\pi D2 \cdot t/4)\rho/P\} \cdot dT/dt$$

P: incoming output

C: heat capacity dT/dt: change of temperature in a unit time

When the absorption factor increases, a temperature distribution occurs inside the output mirror, which also causes a distribution of refraction factors to be generated therein, and the same effect as that obtained when a lens is inserted into a gap right behind the output mirror occurs therein (light has the property that it travels in a higher direction of a refraction factor). The effect described above is called heat lens.

A focal distance f between an absorption factor $\alpha$ and a heat lens is expressed by the equation described below:

$$\begin{aligned} 1/f &= \alpha \cdot P \cdot \chi/(2\pi\omega^2 \cdot \lambda \cdot t) \\ &= (1/8)(\chi \cdot C \cdot \rho \cdot D^2/\omega^2)dT/dt \end{aligned}$$

$\chi$: optical strain parameter $\lambda$: thermal conductivity

Figure 10A:
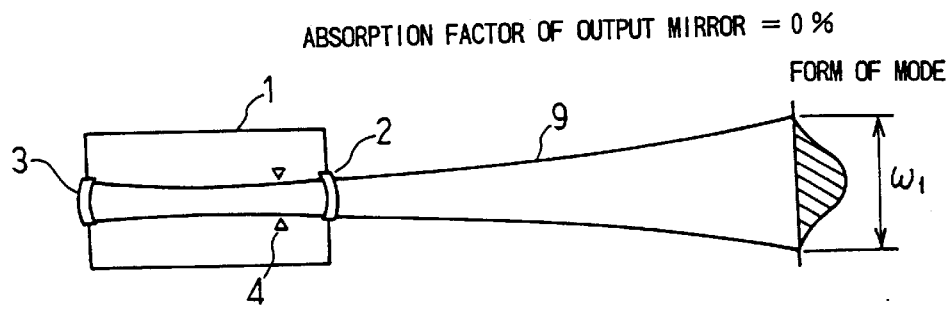
FIGS. 10A to 10C are concept views showing a method of controlling beam characteristics with the laser apparatus shown in FIG. 9.
Figure 10B:
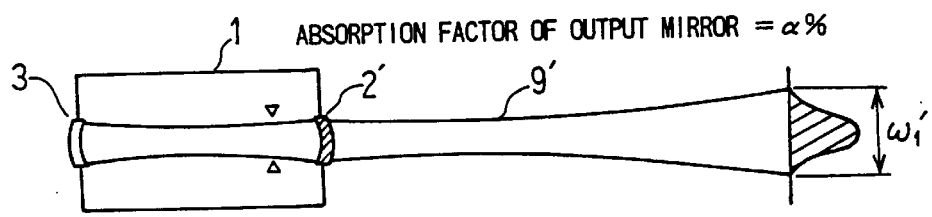
Figure 10C:
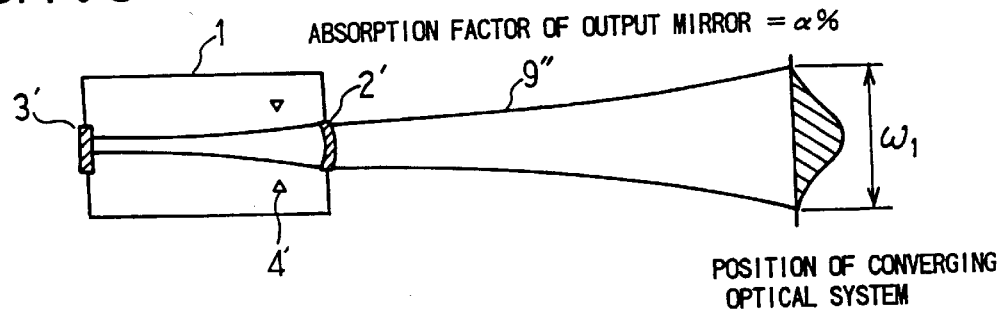

When the heat lens is generated, a laser beam outgoing from the output mirror 2 propagates just like in a case where a lens having a focal distance f is inserted behind the optical axis of the output mirror 2 as shown in FIG. 10A showing the propagating characteristics before generation of the heat lens, and is changed as shown in FIG. 10B. For this reason, a signal from the temperature detector 19 is sent to the central processing unit, and an absorption factor of the output mirror (a focal distance of a heat lens) is detected, so that the central processing unit outputs a signal for changing a curvature of the full reflection mirror 3 and the propagating characteristics are changed thereby. At the same time the central processing unit outputs a signal also to the aperture means 4, and controls a degree of the beam mode at a constant level by setting a value of $\phi/\omega$ to a constant value for making the beam as that shown in FIG. 10C. With the operations described above, the characteristics of the incoming beam into the converging means 6 is kept in the constant state, which makes it possible to realize stable machining.

Figure 11:
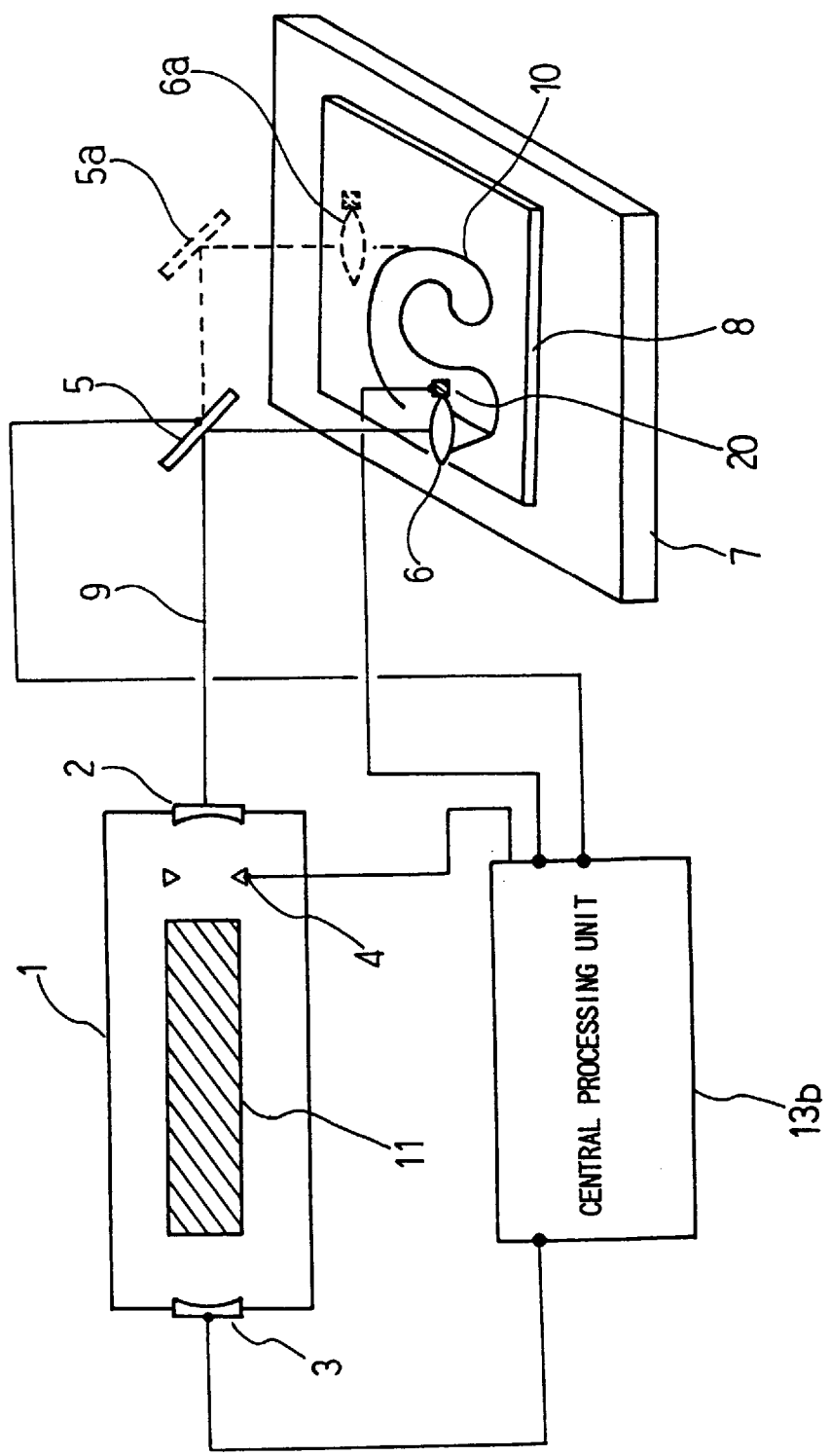
FIG. 11 is a view showing configuration of a laser apparatus according to Embodiment 3 of the present invention.

FIG. 11 is a view showing configuration of a laser apparatus according to Embodiment 3 of the present invention.

In the figure, the reference numeral 20 indicates a temperature detector attached to the converging means 6. In the figure, the same reference numerals are assigned to the sections corresponding to those in Embodiment 1 or in the example based on the conventional technology, so that description thereof is omitted herein. If the converging means 6 is used for a long period of time, an absorption factor of the converging means increases because of deposition of dust, oil mist, or spatters due to machining thereon. When the absorption factor of the converging means increases, distribution of a refraction factor is generated inside the converging means, and the same effect as that obtained in a case when a lens is inserted into a gap right behind the converging means occurs therein. The effect described above is called as heat lens.

Figure 12A:
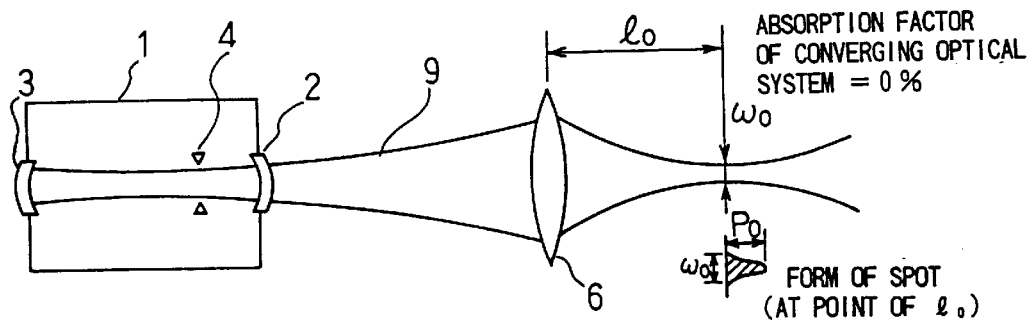
FIGS. 12A to 12C are concept views showing a method of controlling beam characteristics with the laser apparatus shown in FIG. 11.
Figure 12B:
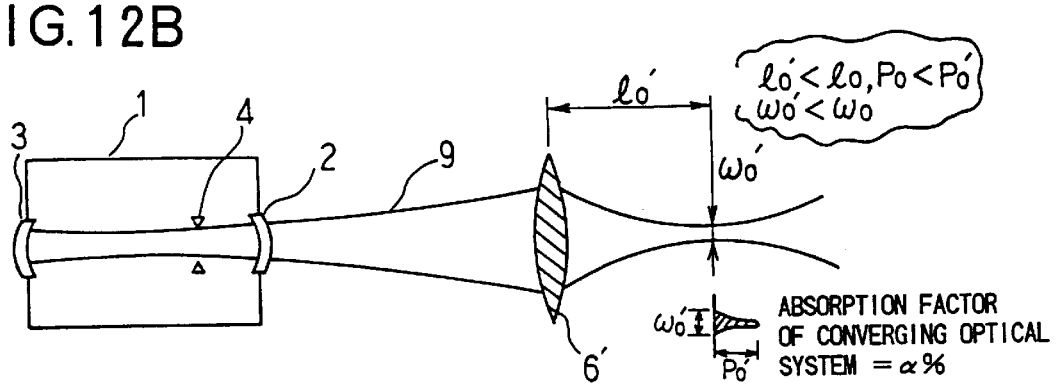
Figure 12C:
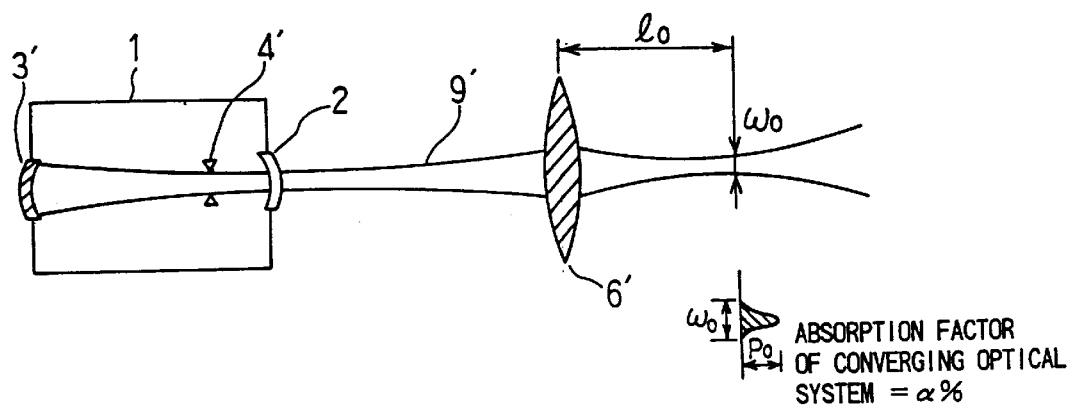

When the heat lens is generated, a laser beam 9 passing through the converging means 6 is changed from that shown in a view of propagating characteristics of FIG. 12A before generation of the heat lens to that shown in FIG. 12B. For this reason, a signal from the temperature detector 20 is sent to the central processing unit 13b, and an absorption factor of the converging means (a focal distance f of a heat lens) is detected, so that the central processing unit 13b outputs a signal for changing a curvature of the full reflection mirror 3 and the propagating characteristics are changed thereby. At the same time, the central processing unit outputs a signal also to the aperture means 4, and controls a degree of the beam mode to be constant by setting a value of $\phi/\omega$ to be constant for making the beam as that shown in FIG. 12C. With the operations described above, the characteristics of the incoming beam into the converging means is kept in the constant state, which makes it possible to realize stable machining.

FIG. 13 is a view showing configuration of a laser apparatus according to Embodiment 4 of the present invention.

Figure 14A:
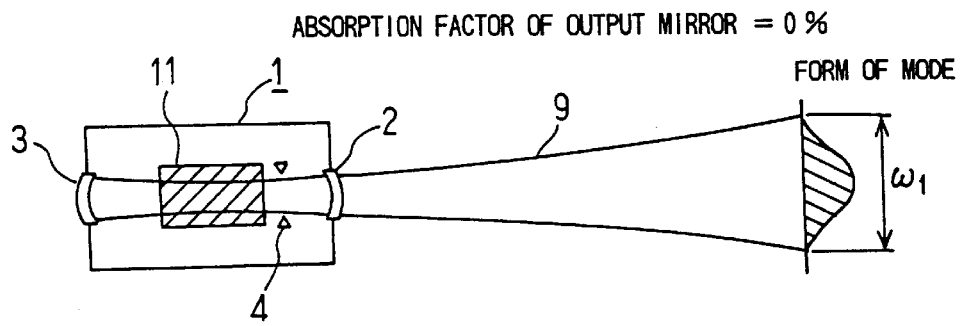
FIGS. 14A to 14C are concept views showing a method of controlling beam characteristics with the laser apparatus shown in FIG. 13.
Figure 14B:
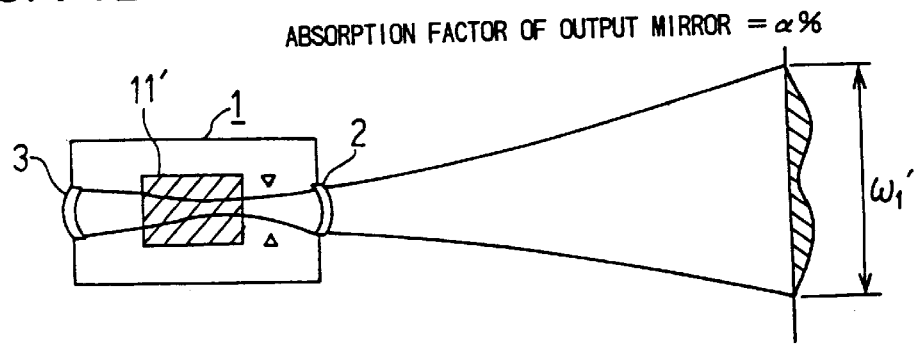
Figure 14C:
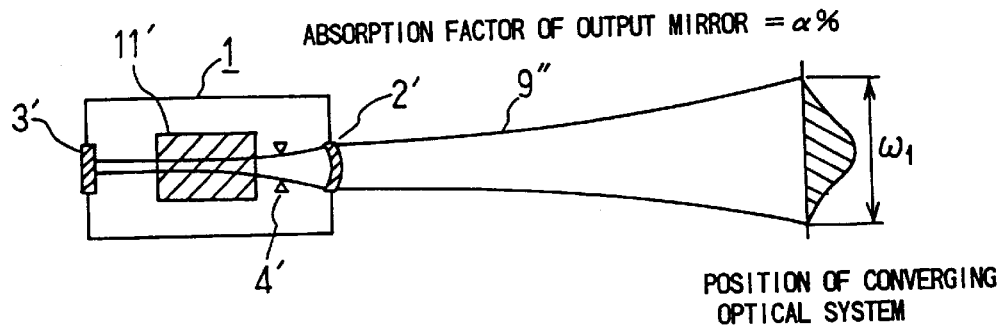

In the figure, the reference numeral 21 indicates a temperature detector attached to a laser medium 11. The same reference numerals are assigned to the sections in the figure corresponding to those in Embodiment 1 or in the example based on the conventional technology, so that description thereof is omitted herein. When the laser medium 11 is used for a long period of time if it is, for instance, a solid laser, an absorption factor of the laser medium increases because of deposition of dust or oil mist thereon. When the absorption factor of the laser medium increases, a distribution of refraction factors is generated inside the laser medium, and the same effect as that obtained when a lens is inserted inside the laser medium occurs therein. The effect described above is called as heat lens. When the heat lens is generated, a laser beam 9 passing through the laser medium receives the effect from the lens and is changed from that shown in FIG. 14A showing the propagating characteristics before generation of the heat lens to that shown in FIG. 14B. For this reason, a signal from the temperature detector 21 is sent to the central processing unit 13c, and an absorption factor of the laser medium (a volume of the heat lens) is detected, so that the central processing unit 13c outputs a signal for changing a curvature of the full reflection mirror 3 and the propagating characteristics are changed thereby. The central processing unit simultaneously outputs a signal also to the aperture means 4, and controls a degree of the beam mode to be constant by setting a value of $\phi/\omega$ to a constant value for making the beam as that shown in FIG. 14C. With the operations described above, the characteristics of the incoming beam into the converging means is kept in the constant state, which makes it possible to realize stable machining.

Of the beam characteristics, a diameter of a beam incoming into the converging means 6 is discussed herein. In a case where a divergence angle incoming into the converging means is small (mrad order), a converging spot size d can be expressed by the equation described below:

$$d = 1.27 \cdot M^2 \cdot \text{o} \cdot f/D \qquad (1)$$

D: Diameter of an incoming beam into a converging means $\lambda$: Wavelength f: Focal distance of a converging means $M^2$: Converging characteristics (=mode degree+1)

With the equation described above, if the central processing unit controls a curvature of the full reflection mirror 3 and a diameter of the aperture means 4 according to a position of the reflection mirror 5 so that a diameter D of an incoming beam into a converging optical system will be kept constant, a constant converging spot size of the beam can be obtained, whereby machining can be stabilized.

Also, of the beam characteristics, the converging characteristics of an incoming beam into the converging means 6 is discussed below. In a case where a divergence angle of a beam incoming into the converging means is small (mrad order), a converging spot size d can be expressed by the equation (1). With the equation described above, if the central processing unit controls a curvature of the full reflection mirror 3 and a diameter of the aperture means 4 according to a position of the reflection mirror 5 so that the converging characteristic $M^2$ of the incoming beam into the converging optical system will be changed by the value by which the diameter D of the incoming beam into the converging means has been changed, a constant converging spot size of the beam can be obtained, whereby machining can be stabilized.

Figure 15:
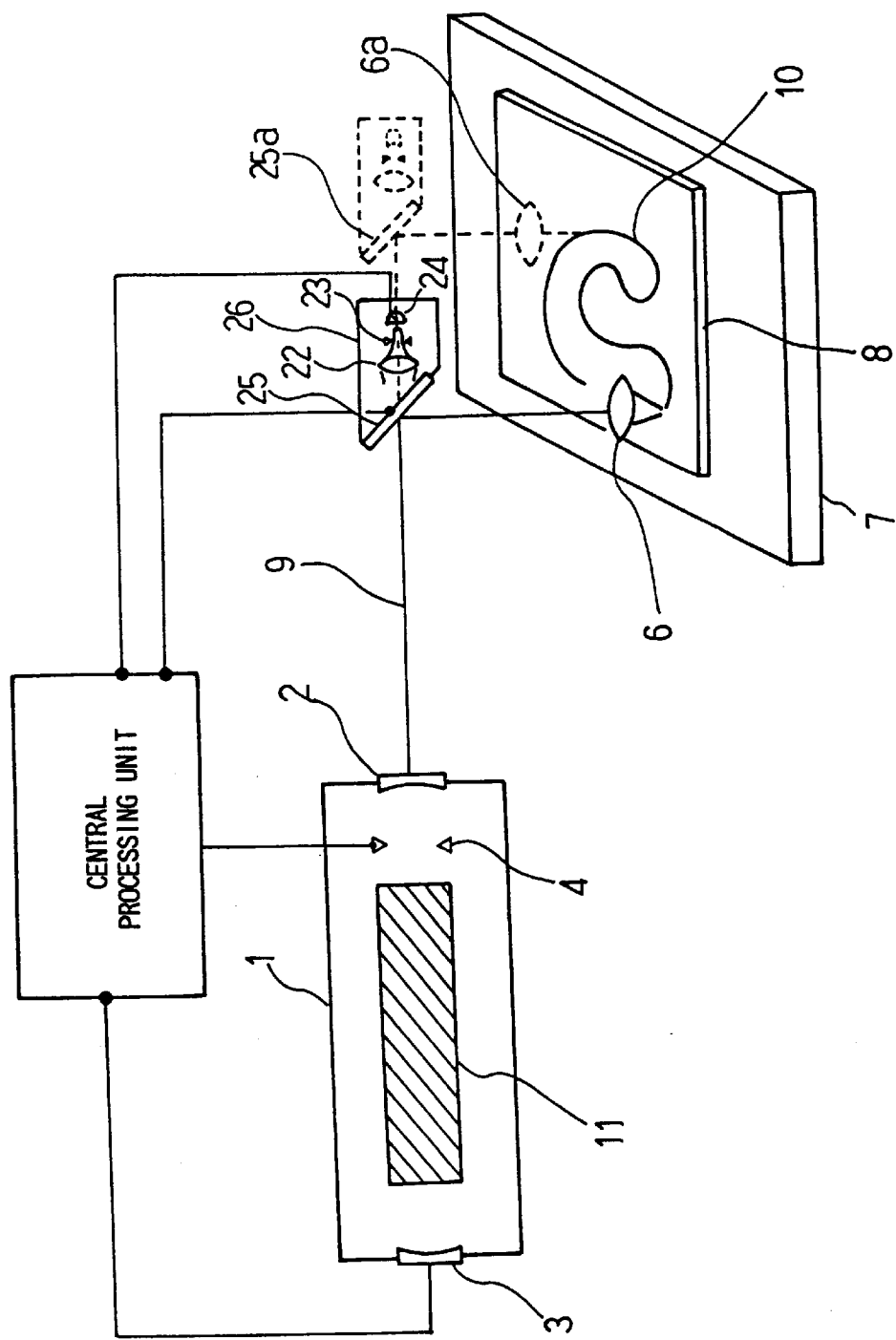
FIG. 15 is a view showing configuration of a laser apparatus according to Embodiment 5 of the present invention.
Figure 16:
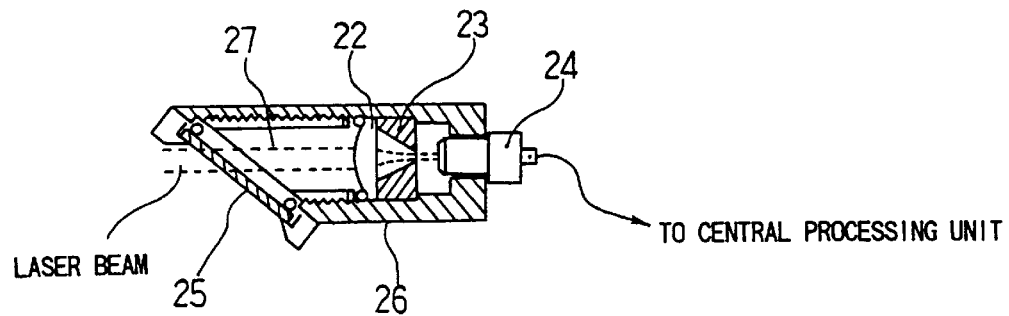
FIG. 16 is a view showing configuration of converging characteristics detecting means in the laser apparatus shown in FIG. 15.

FIG. 15 is a view showing configuration of a laser apparatus according to Embodiment 5 of the present invention. FIG. 16 is a view showing configuration of the converging characteristics detecting means of the laser apparatus shown in FIG. 15.

In the figure, designated at the reference numerals 22 is a lens, at 23 an aperture means, at 24 a detector, at 25 a reflection mirror for transmitting therethrough an extremely small portion of a laser beam and reflecting the most of the beam therefrom, and at 26 a converging characteristics detecting means monolithically comprising the lens 22, aperture means 23, detector 24, and reflection mirror 25. The same reference numerals are assigned to the sections in the figure corresponding to those in Embodiment 1 or the example based on the conventional technology, so that description thereof is omitted herein. When a distance between the output mirror 24 and the converging means 6 is changed, the position of the reflection mirror 25 at the right above of the converging means 6 is change to that indicated by the reference numeral 25a. A portion of the laser beam 27 transmitting the reflection mirror 25 passes through the lens 22 for convergence. The aperture means 23 is provided at a specified distance from the lens 22, and a laser beam passing through the aperture means passes through the detector 24. The propagating characteristic of a laser beam 9 is changed by the full reflection mirror 3 in the laser oscillator 1 so that an output value from the detector 24 will be kept constant, and a diameter of the aperture means 4 is changed so that an identical mode form will be obtained, and for this reason the identical beam characteristics can be obtained at the positions of the reflection mirrors 25 and 25a. And furthermore the beam characteristics of a beam incoming into the converging means 6 can identically be controlled. For this reason, even if a length of light path is changed, the constant beam characteristic can be obtained in the entire area, which makes it possible to realize stable machining.

This embodiment shows a means for changing a curvature of the full reflection mirror 3 from Embodiment 1 to Embodiment 5 each described until now.

Figure 17:
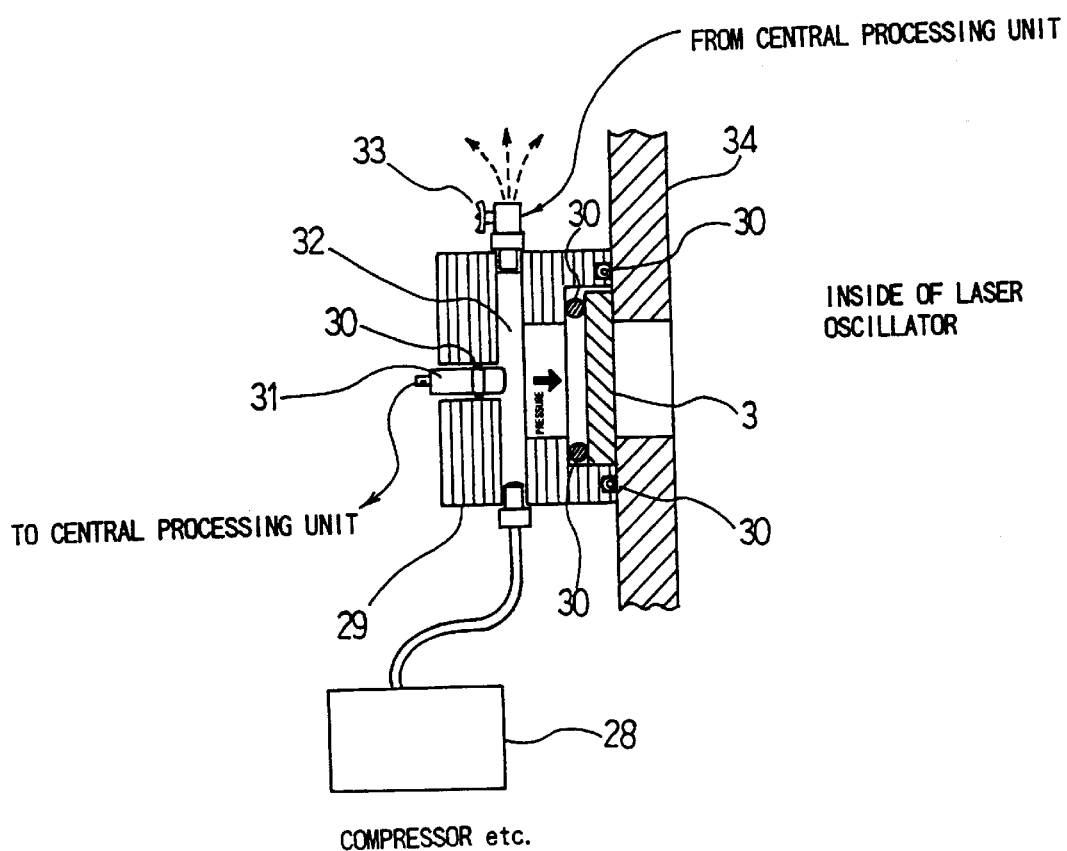
FIG. 17 is a view showing construction of the full reflection mirror in the laser apparatus according to any of Embodiments 1 to 5 of the present invention.

FIG. 17 is an enlarged view of the full reflection mirror 3.

In the figure, designated at the reference numeral 28 is a compressor for supplying a compressed air, at 29 a mirror holder for holding the full reflection mirror 3, at 30 an O-ring, at 31 a pressure sensor for detecting a pressure of a sealed cavity section 32, at 33 a valve enabling control opening/closing according to a signal obtained from the central processing unit 13, and at 34 a housing of the laser oscillator 1. When the compressed air is sent from the compressor 28 to the cavity section 32, the pressure in the cavity section is increased. The reflection mirror 3 is changed to a convex form according to a pressure difference between the cavity section and the housing 34 (at the right side in the drawing). A degree of changing to the convex form is made according to the pressure in the cavity section, and a curvature of the full reflection mirror 3 is changed. The control of a curvature of the full reflection mirror 3 is executed by opening or closing the valve 33 or changing a size of the aperture according to a signal from the pressure sensor 31 so that the pressure will become as determined by the central processing unit 13. A table of curvatures corresponding to each of pressure is previously stored in the central processing unit, or a curvature is obtained by computation thereby. With this control, a curvature for a specific purpose can be selected, which makes it possible to stabilize the machining.

Figure 18:
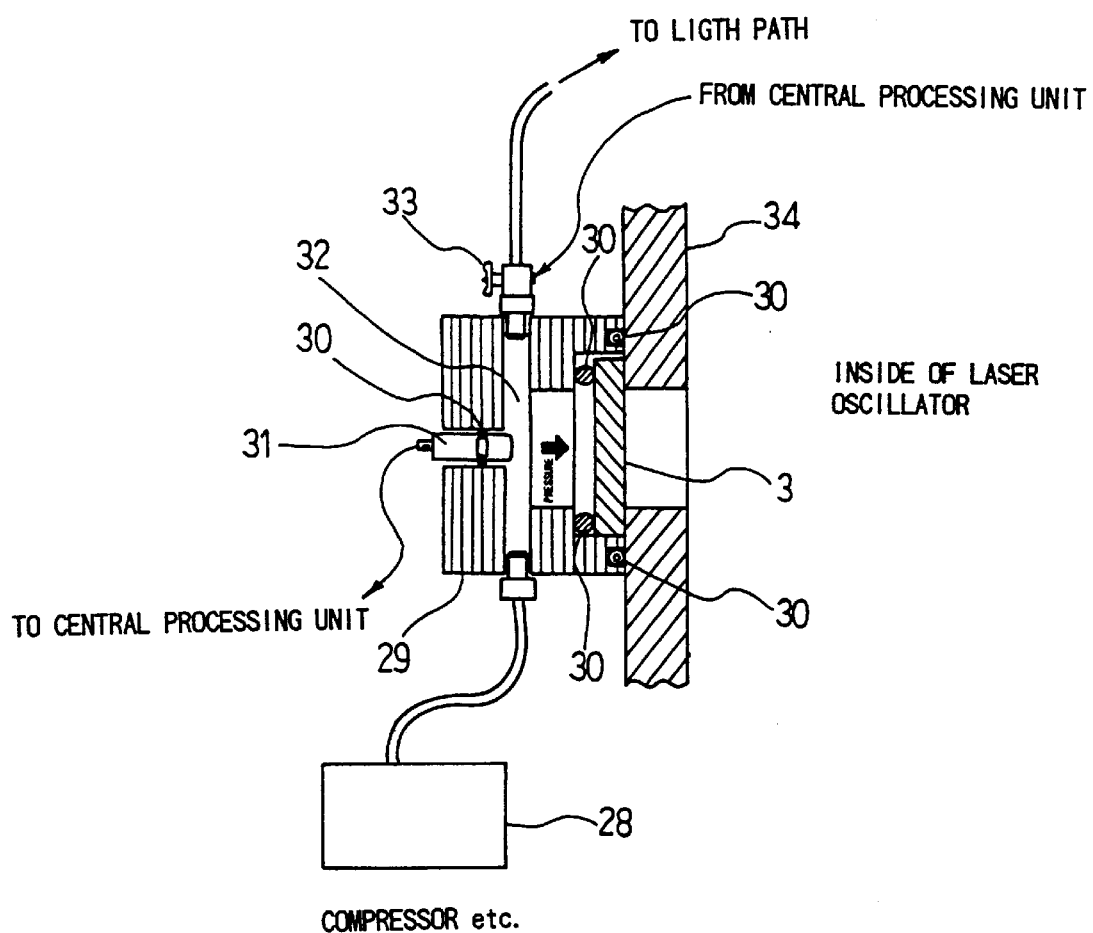
FIG. 18 is a construction view of a full reflection mirror in the laser apparatus according to Embodiment 7 of the present invention.
Figure 19:
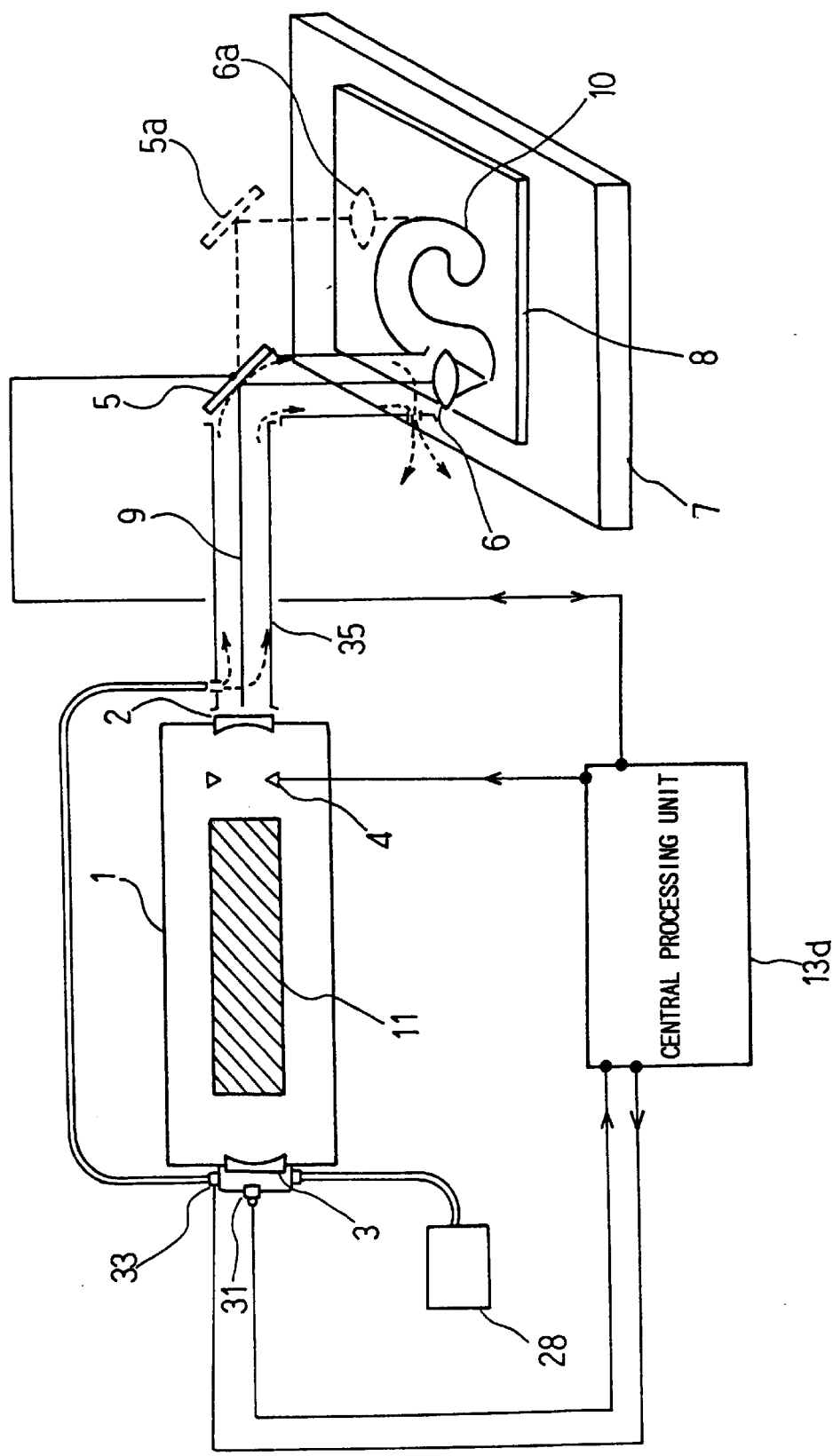
FIG. 19 is a view showing configuration of a laser apparatus according to Embodiment 7 of the present invention.

In a case where the pressure medium used in Embodiment 6 is a gas not absorbing a laser beam, light path pipe 35 and the valve 33 are provided as shown in FIGS. 18 and 19, and are utilized for purging inside of the light path. If inside of the light path is purged, a pressure difference occurs between the inside and the outside of the light path, a laser absorbing gas can not go into the inside from the outside, and the beam characteristics can be transferred as far as the converging means 6 with stability. By using the medium used for changing a curvature of the full reflection mirror 3 for purging the light path, a low-cost laser apparatus with a low running cost can be provided.

Figure 20:
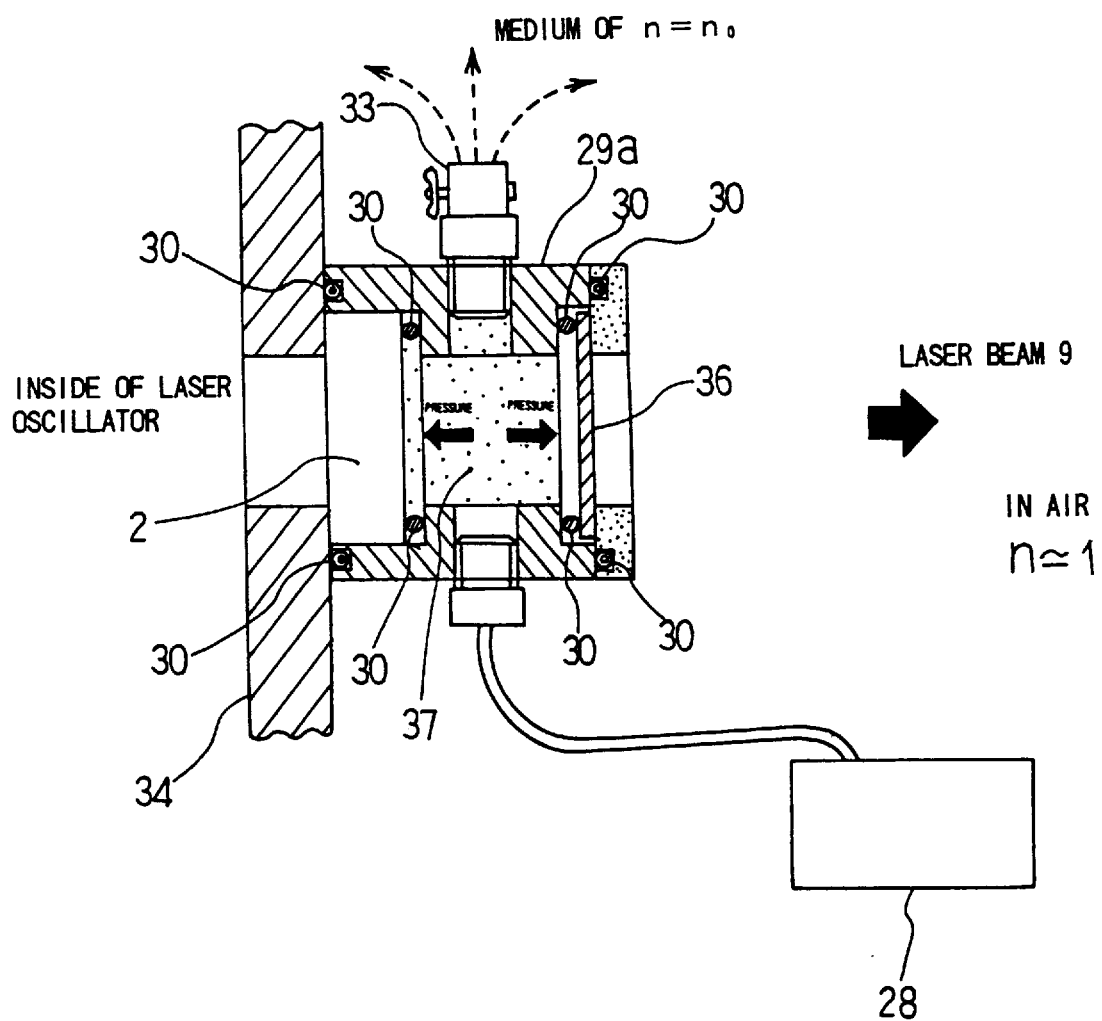
FIG. 20 is a view showing a construction for explanation of changing a curvature of a transmission mirror in a laser apparatus according to Embodiment 8 of the present invention.

FIG. 20 is a construction view for explanation of changing a curvature of a transmission mirror in a laser apparatus according to Embodiment 8 of the present invention.

In FIG. 20, designated at the reference numeral 36 is a transmission mirror made from a material with the thickness thinner or the Young's modulus smaller than that of the output mirror 2, and at 37 a cavity. In the figure, the same reference numerals are described in Embodiment 1, Embodiment 6, and in the example based on the conventional technology, so that description thereof is omitted herein. When the pressure medium is sent into the cavity 37 by the compressor 28, the pressure is added to the output mirror 2 from the right side of the figure, while the pressure is added to a transmission mirror 36 from the left side of the figure.

The transmission mirror 36 is made from a material with the thickness thinner or the Young's modulus smaller than that of the output mirror 2, so that, if the same pressure is added to both of the transmission mirror and the output mirror, a curvature of the transmission mirror is more largely changed than that of the output mirror. In this case, when a refraction factor in the light path side (e.g. air) and a refraction factor of a pressure medium are completely identical, a laser beam 9 passing through the transmission mirror is not changed, but in a case where the refraction of a pressure medium is different, the propagating characteristic of a laser beam 9 is changed. Namely, this pressure medium induces such an effect that a lens has. As rigidity of the output mirror is stronger than that of the transmission mirror, a change of a curvature of the output mirror is hardly generated, so that the beam characteristic of the laser beam obtained from the output mirror is not changed, but the pressure medium changes the beam characteristic according to a change of a curvature of the transmission mirror. For this reason, it is possible to provide a laser apparatus in which the different beam characteristic can be realized at a given position.

Figure 21:
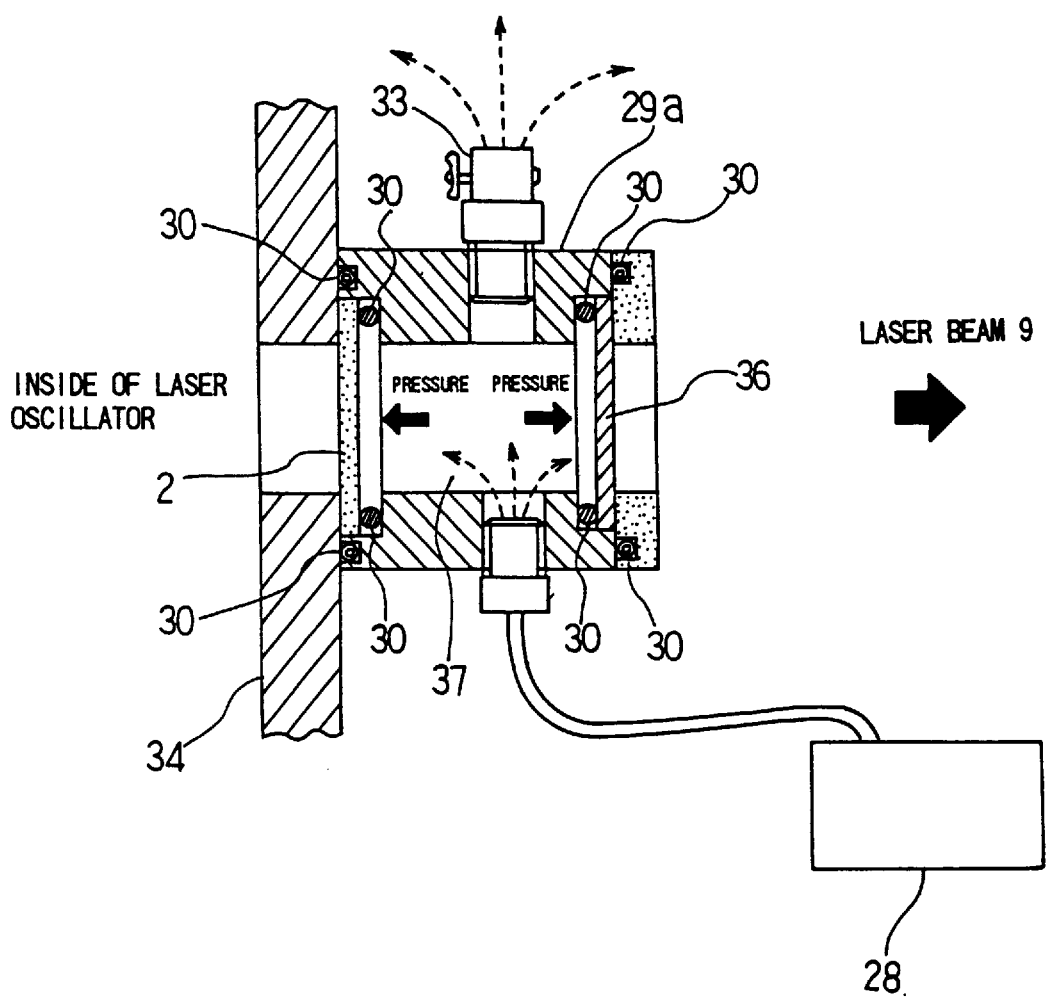
FIG. 21 is a construction view for explanation of changing a curvature of an output mirror in a laser apparatus according to Embodiment 9 of the present invention.

FIG. 21 is a construction view for explanation of changing a curvature of an output mirror in a laser apparatus according to Embodiment 9 of the present invention.

Although FIG. 21 is almost the same as that in Embodiment 8, a thickness and a material of the output mirror 2 may be the same as those in the transmission mirror 36. When the pressure is added to both the output and transmission mirrors as described in Embodiment 8, a curvature of the output mirror is also changed in this case.

Accordingly, the beam characteristics (a mode degree (converging characteristics) and the propagating characteristics) obtained from the laser oscillator 1 can also be changed. And for this reason, it is possible to provide a laser apparatus in which different beam characteristics can be obtained with one unit of laser apparatus.

There is a case where an operator wants to change only the propagating characteristics, but does not want to change a mode degree, of the different beam characteristics obtained in Embodiment 9. In this case, a diameter of the aperture means 4 is changed in accordance with change of a curvature of the output mirror 2. If an appropriate diameter of the aperture is set in accordance with the curvature of the output mirror, an identical mode degree can be obtained, and the characteristics of a beam incoming into the converging means can be fixed in the laser apparatus in which a distance between the output mirror and converging means is changed, so that stable machining can be realized. In this step a curvature of the transmission mirror is also changed, but if the refraction factor of the pressure medium is the same as that of light path, there are no effects to the laser beam outputted from the output mirror.

Figure 22:
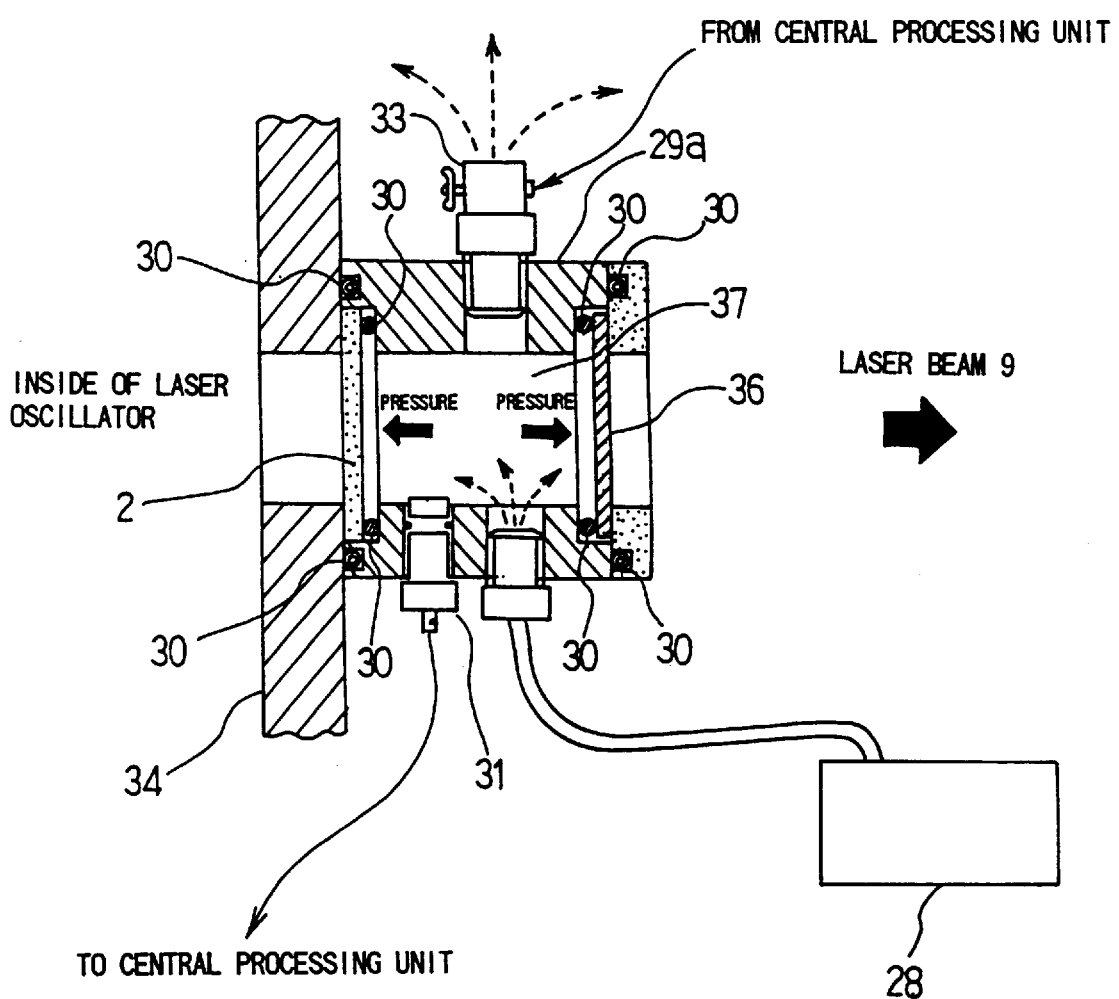
FIG. 22 is a construction view for explanation of changing a curvature of an output mirror in a laser apparatus according to Embodiment 10 of the present invention.

FIG. 22 is a construction view for explanation of change of a curvature of an output mirror in a laser apparatus according to Embodiment 10 of the present invention.

FIG. 22 is different from FIG. 20 and FIG. 21 in that the pressure sensor 31 is located therein. With this feature, the central processing unit 13 can control the mirrors. In order to monitor change of a curvature of the transmission mirror 36 or the output mirror 2, the central processing unit controls a pressure in the cavity 37 to control a curvature by opening or closing the valve 33 or changing the diameter of a beam according to a signal from the pressure sensor 31. A value of the pressure may be decided by referring to numeral data stored in the storing device or by computing, and the central processing unit provides all the controls described above. With this feature, a laser apparatus enabling various types of control can be obtained.

Figure 23:
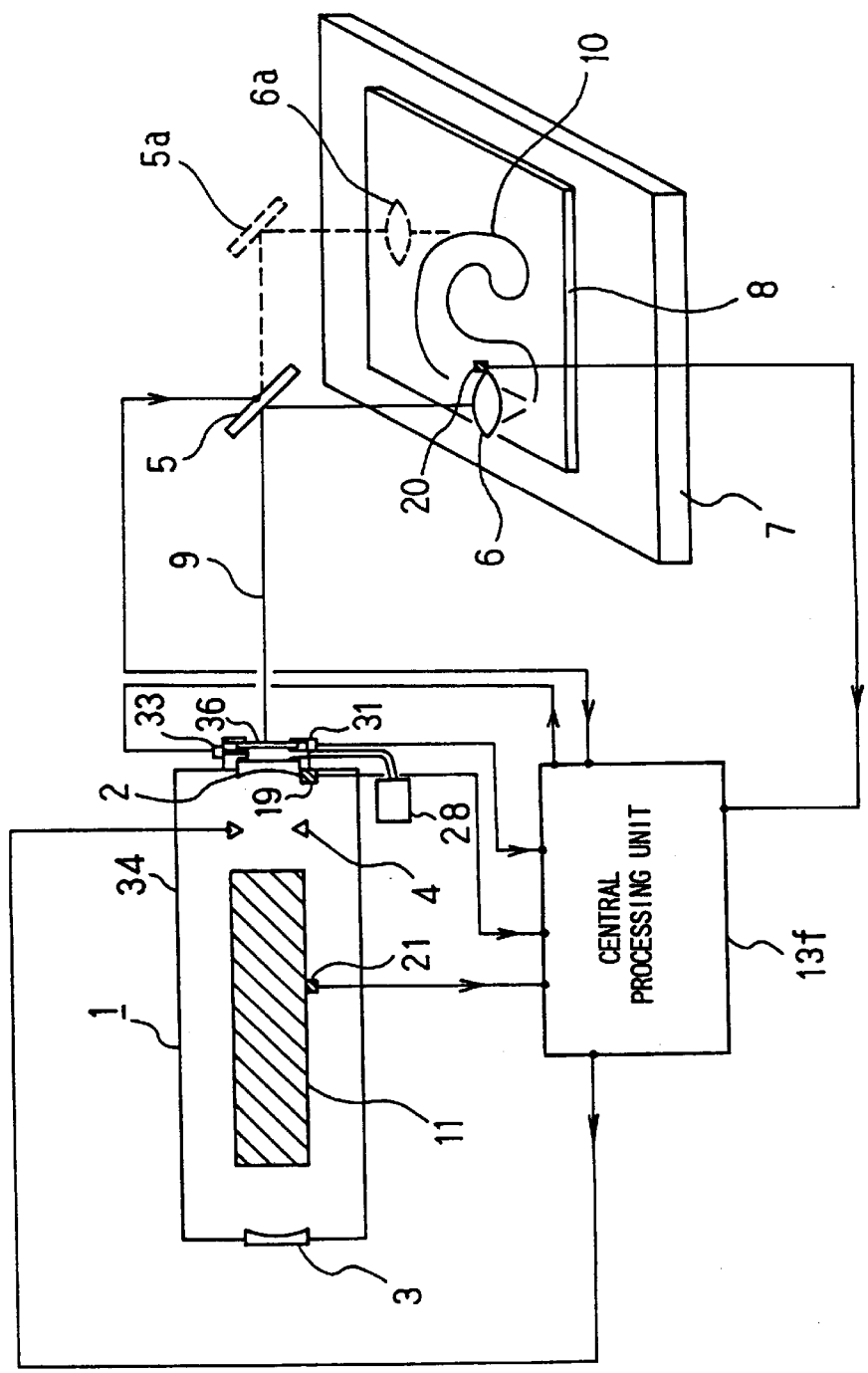
FIG. 23 is a view showing configuration of a laser apparatus according to Embodiment 11 of the present invention.

FIG. 23 is a view showing configuration of a laser apparatus according to Embodiment 11 of the present invention, and this embodiment is the application of Embodiment 8, so that the general configuration is basically the same as the latter. The beam characteristics obtained from the laser apparatus and irradiated to a workpiece are dependent on a heat absorption factor of the output mirror or of the converging means, or on a length of light path between the output mirror and converging means.

For this reason, a curvature of the transmission mirror is controlled so that the beam characteristics irradiated to a workpiece substantially coincide with those in the value before change even if the value described above is changed. With the control described above, it is possible to provide a laser apparatus enabling stable laser-machining.

The characteristics of a beam obtained from the laser apparatus and irradiated onto a workpiece are dependent on a heat absorption factor of the output mirror or of the converging means, or on a length of light path between the output mirror and converging means. For this reason, a curvature of the output mirror and a diameter of the aperture means are controlled so that the characteristics of a beam irradiated to a workpiece substantially coincide with those in the value before change even if the value described above is changed. With the control described above, it is possible to provide a laser apparatus enabling stable laser-machining.

Figure 24:
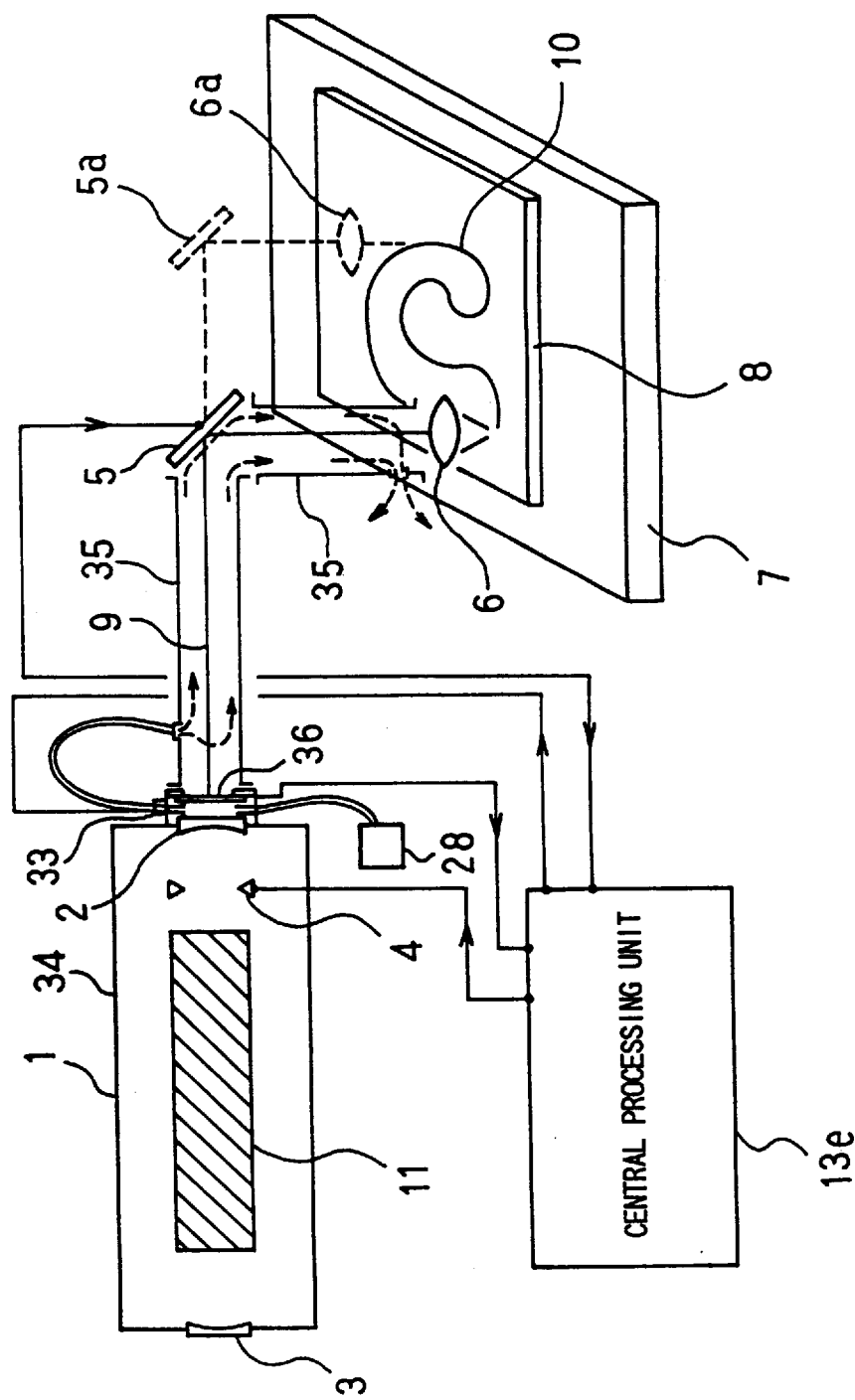
FIG. 24 is a view showing configuration of a laser apparatus according to Embodiment 12 of the present invention.

FIG. 24 is a view showing configuration of a laser apparatus according to Embodiment 12 of the present invention.

In FIG. 24, the same reference numerals assigned to the sections corresponding to those in Embodiment 7 or to the example based on the conventional technology have the same configuration, so that description thereof is omitted herein. In a case where the pressure medium used for changing a curvature of the output mirror 2 is a gas not absorbing a laser beam, the light path pipe 35 and the valve 33 are provided therein, and are utilized for purging inside of the light path. If the inside of the light path is purged, a pressure difference occurs between the inside and the outside of the light path, a laser absorbing gas can not go into the inside from the outside, and the beam characteristics can be transferred as far as the converging means 6 with stability. By using the medium used for changing a curvature of the output mirror 2 for purging the light path, a low-cost laser apparatus with a low running cost can be provided.

Figure 25:
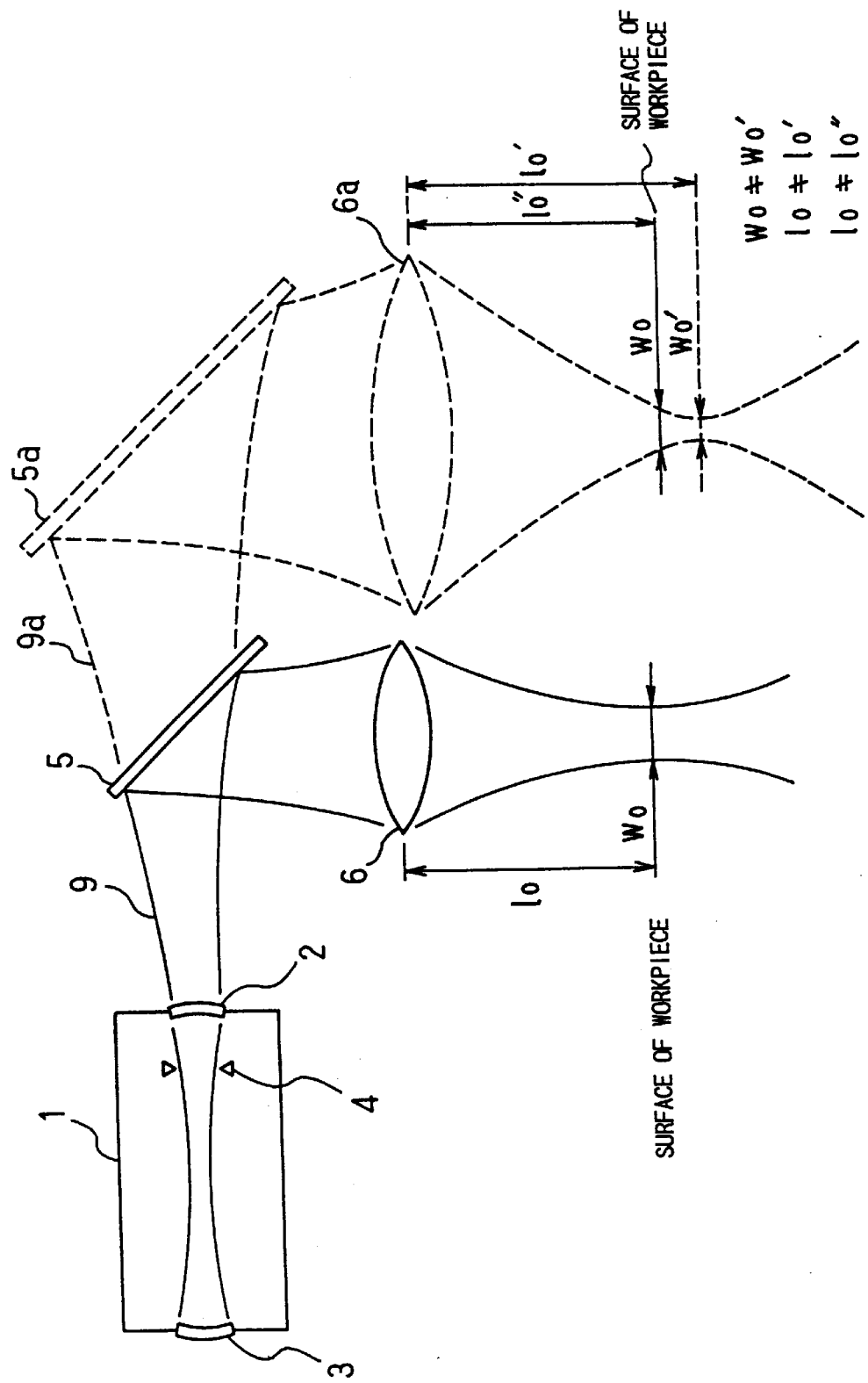
FIG. 25 is a simulated view showing propagation of a beam from a laser apparatus according to Embodiment 13 of the present invention.

FIG. 25 is a simulated view showing propagation of a beam from a laser apparatus according to Embodiment 13 of the present invention.

The conventional type of laser beam machine is controlled so that a distance from a converging means to a workpiece would be kept constant. For this reason, as shown in FIG. 30, a diameter of a beam irradiated to the workpiece was changed, which induced machining failure. By the way, as shown in FIG. 25, a distance between the converging means and the workpiece is changed according to a length of light path. For instance, at the position of the reflection mirror 5, the distance from the surface of the workpiece has a distance $l_0$ from the converging means 6, and at the position of the reflection mirror 5a, the distance thereof is changed to the distance $l_0"$, and a spot size of a laser beam irradiated to the surface of the workpiece is to be adjusted to $\omega_0$. If a spot size of the beam irradiated to the workpiece is controlled so that the size will be kept constant, it is possible to provide a laser apparatus enabling stable machining even if the length of the light path is changed.

Also in the conventional type of laser machine, when an absorption factor was increased due to degradation of the output mirror or the converging means, a diameter of a beam irradiated to a workpiece was changed, which caused to induce machining failure as shown in FIG. 10B and FIG. 12B. By the way, as shown in FIG. 25, if a distance between the converging means and the workpiece is changed according to a signal from the temperature detector provided in the output mirror or the converging means and a spot size of the beam irradiated to the workpiece is controlled so that the size will be kept constant, it is possible to provide a laser apparatus enabling stable machining even if the propagating characteristics are changed due to degradation of the optical system.

Figure 26:
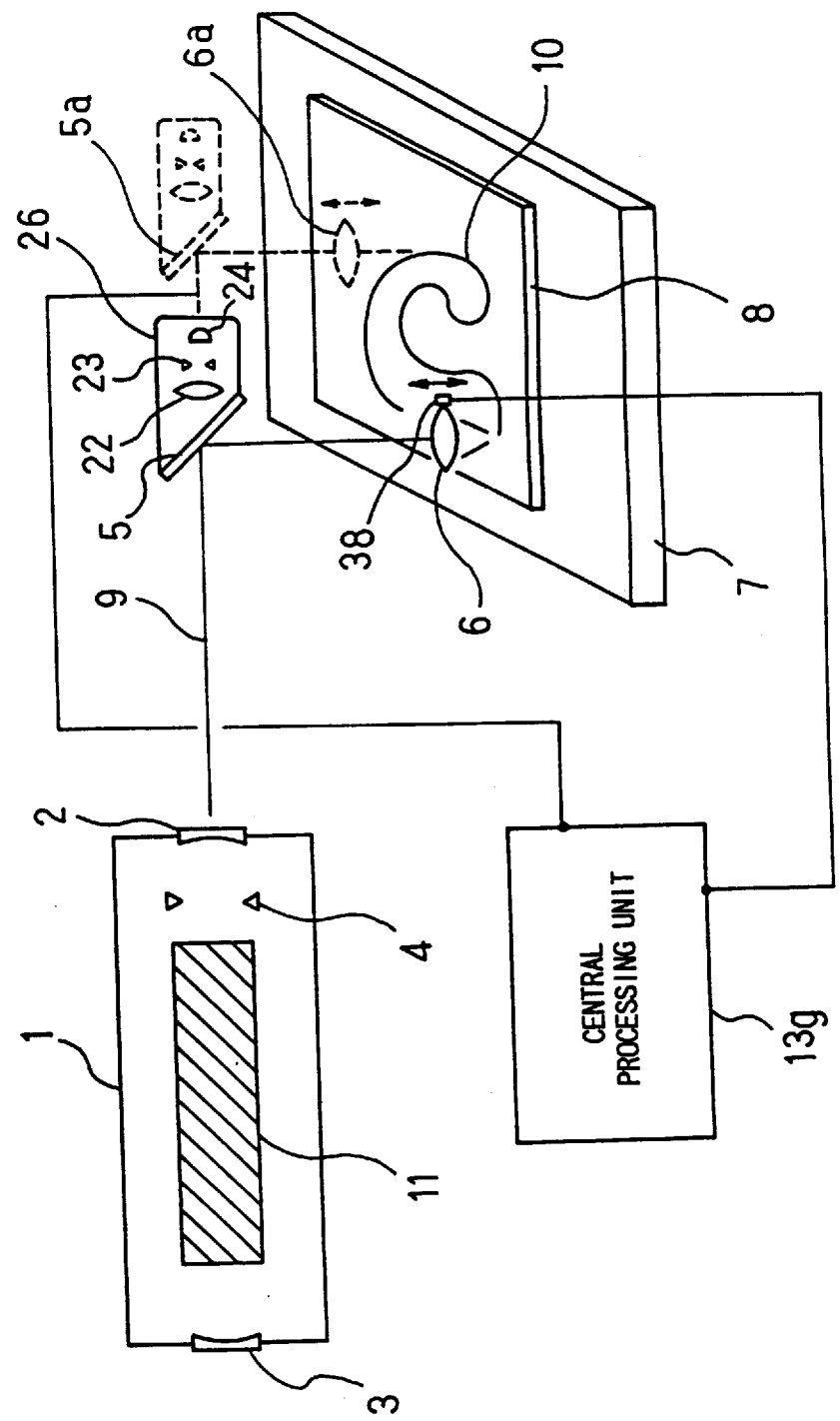
FIG. 26 is a view showing configuration of a laser apparatus according to Embodiment 14 of the present invention.

FIG. 26 is a view showing configuration of a laser apparatus according to Embodiment 14 of the present invention.

In FIG. 26, the reference numeral 38 indicates a driving control section which can keep at least one piece of lens constituting the converging means away from the workpiece 8 or get it close thereto. The converging characteristics detector 26 may have the same configuration as that shown in FIG. 16. The conventional type of laser beam machine controlled so that a distance from a converging means to a workpiece would be kept constant. For this reason, if beam characteristics are changed due to external factors (e.g., thermal distortion of the output mirror, or absorption of a laser beam due to a gas inside the light path or the like), similarly as shown in FIGS. 10A to 10C and FIGS. 12A to 12C, a diameter of a beam irradiated to the workpiece was changed, which induced machining failure. By the way, as shown in FIG. 26, if the converging characteristics detector 26 is provided between the output mirror and the converging means, a distance between the converging means and the workpiece is changed according to output from the detector and a spot size of the beam irradiated to the workpiece is controlled so that the size will be kept constant, machining can be stabilized even if external factors such as change of a length of light path or a heat lens of the output mirror or the like are changed.

Figure 27:
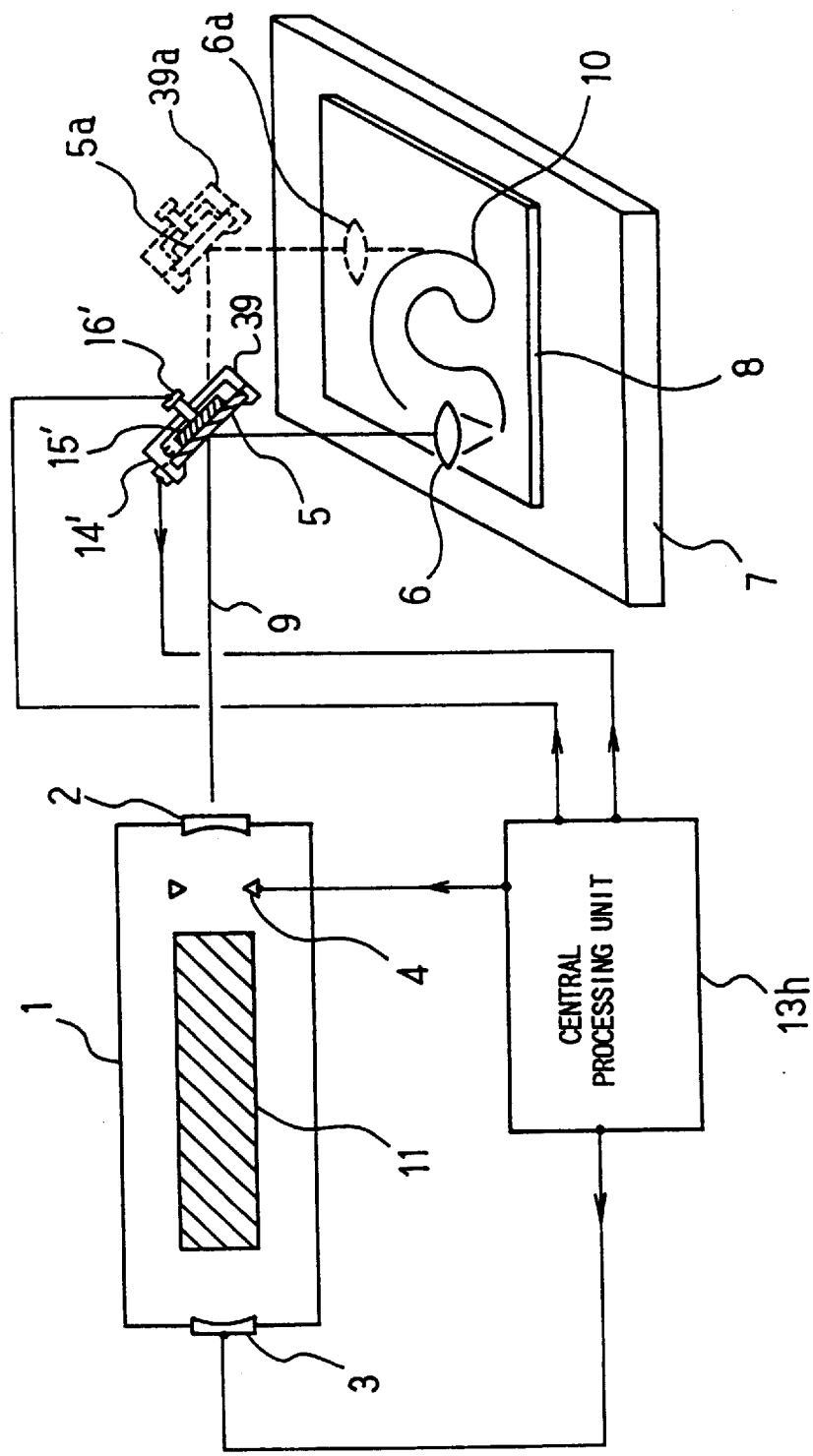
FIG. 27 is a view showing configuration of a laser apparatus according to Embodiment 15 of the present invention.

FIG. 27 is a view showing configuration of a laser apparatus according to Embodiment 15 of the present invention.

In FIG. 27, the reference numeral 39 indicates a holder located in light path system and for enabling change of a curvature of the reflection mirror 5. In the figure, each of the reference numerals 14', 15' and 16' may have the same configuration as that in FIG. 2 respectively. The same reference numerals are assigned to the sections other than the items described above corresponding to those in Embodiment 1, so that description thereof is omitted herein. FIG. 28 shows a system for changing a curvature of the full reflection mirror 3, a diameter of the aperture means 4, and a curvature of the reflection mirror 5 according to, for instance, a length of light path (a distant point, a near point).

In the figure, a form of the full reflection mirror 3 is substantially flat at a near point with the an aperture set to a slightly larger diameter, and a laser beam 9 is reflected onto the reflection mirror 5 through a diameter $D_0$ and comes into the converging means at a divergence angle $\theta$. At a distant point, the full reflection mirror 3 has a curvature, a diameter of the aperture means 4 is made smaller, and a beam is reflected onto the reflection mirror 5a with the same mode degree and through the same diameter $D_0$ of the beam each as that at the near point. The divergence angle of a laser beam 9a at the distant point is smaller as compared to that of the beam 9, so that the reflection mirror 5a is changed to a convex form, and the beam is guided into a converging means 6a at the same divergence angle $\theta$ as that at the near point. In the embodiments described above, the case is described where a position of a beam spot irradiated onto a workpiece is a focal surface, but in this embodiment, effects can appear specifically in a case where a focal surface is not used for machining or measurement. A wave surface of a laser beam is infinite on a focal surface, and a divergence angle of the beam to a workpiece apparently becomes 0°. However, when the focal surface is not used for machining, the beam having a certain divergence angle $\theta_0$ is irradiated to the workpiece 8 as shown in FIG. 28.

To keep up the state described above even in a case where a length of light path is changed or external factors are changed, not only a diameter of a beam and a mode degree (converging characteristics) included in the beam characteristics are required to be kept constant, but also a divergence angle of the beam incoming into the converging means is required to be identical. In order to realize the conditions described above, it is required to give some change to at least two points of optical system in the optical system. The operation is executed in the laser oscillator 1 as one of the two points, so that, if the operation is additionally executed at the reflection mirror 5 in the light path, a laser beam with identical diameter, divergence angle, and mode degree of the beam can be introduced into the converging means 6. For this reason, stable machining or measurement can be executed even in machining or measuring method using a point other than a converging point.

In the embodiment described above, especially the system for changing a curvature of the full reflection mirror 3 was described, but the same effect can be achieved even if it is a system for changing a curvature of the output mirror 2 or of the transmission mirror 36. Also, in FIG. 26, light path is a reflected light path with an angle of 90°, so that, if a convex plate is not made to a convex with a spherical surface but to a convex with a paraboloid, the aberration is made smaller so that the effect can be enhanced further.

This application is based on Japanese patent application No. HEI 8-219946 filed in the Japanese Patent Office on Aug. 21, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A laser apparatus comprising:

an output mirror for reflecting a portion of a laser beam and transmitting therethrough a remaining portion thereof;

a full reflection mirror located at a position opposite to said output mirror for completely reflecting a laser beam and having a variable curvature;

a laser medium provided between said output mirror and said full reflection mirror which produces induced emission of radiation;

an aperture means for determining a beam mode of a laser beam generated between said output mirror and said full reflection mirror and having a variable aperture diameter; and a converging means for converging an outgoing laser beam from said output mirror and changing a distance from said output mirror according to a machining path; wherein said curvature of said full reflection mirror is varied and also said diameter of said aperture means is varied.

2. A laser apparatus according to claim 1; wherein said curvature of said full reflection mirror and said diameter of said aperture means are set so that a diameter of a beam incoming into said converging means is kept constant.

3. A laser apparatus according to claim 1; wherein said curvature of said full reflection mirror and said diameter of said aperture means are set so that converging characteristics of said converging means in the beam mode are kept constant.

4. A laser apparatus according to claim 1 comprising a reflection mirror for reflecting a laser beam and a converging means for converging said reflected laser beam; wherein a curvature of said reflection mirror is variable.

5. A laser apparatus comprising:

an output mirror for reflecting a portion of a laser beam and transmitting therethrough a remaining portion thereof, said output mirror having an absorption factor detecting means;

a full reflection mirror located at a position opposite to said output mirror for completely reflecting a laser beam and having a variable curvature;

a laser medium provided between said output mirror and said full reflection mirror which produces induced emission of radiation;

an aperture means for determining a beam mode of a laser beam generated between said output mirror and said full reflection mirror and having a variable aperture diameter; and a converging means for converging an outgoing laser beam from said output mirror; wherein said curvature of said full reflection mirror is varied and also said diameter of said aperture means is varied according to change of an absorption factor in said output mirror.

6. A laser apparatus according to claim 5; wherein said curvature of said full reflection mirror and said diameter of said aperture means are set so that a diameter of a beam incoming into said converging means is kept constant.

7. A laser apparatus according to claim 5; wherein said curvature of said full reflection mirror and said diameter of said aperture means are set so that converging characteristics of said converging means in the beam mode are kept constant.

8. A laser apparatus comprising:

an output mirror for reflecting a portion of a laser beam and transmitting therethrough a remaining portion thereof;

a full reflection mirror located at a position opposite to said output mirror for completely reflecting a laser beam and having a variable curvature;

a laser medium provided between said output mirror and said full reflection mirror which produces induced emission of radiation;

an aperture means for determining a beam mode of a laser beam generated between said output mirror and said full reflection mirror and having a variable aperture diameter; and a converging means for converging an outgoing laser beam from said output mirror, said output mirror having an absorption factor detecting means; wherein said curvature of said full reflection mirror is varied and also said diameter of said aperture means is varied according to change of an absorption ratio in said converging means.

9. A laser apparatus according to claim 8; wherein said curvature of said full reflection mirror and said diameter of said aperture means are set so that a diameter of a beam incoming into said converging means is kept constant.

10. A laser apparatus according to claim 8; wherein said curvature of said full reflection mirror and said diameter of said aperture means are set so that converging characteristics of said converging means in the beam mode are kept constant.

11. A laser apparatus comprising:

an output mirror for reflecting a portion of a laser beam and transmitting therethrough a remaining portion thereof;

a full reflection mirror located at a position opposite to said output mirror for completely reflecting a laser beam and having a variable curvature;

a laser medium provided between said output mirror and said full reflection mirror which produces induced emission of radiation, said laser medium having a temperature detecting means;

an aperture means for deciding a beam mode of a laser beam generated between said output mirror and said full reflection mirror and having a variable aperture diameter; and a converging means for converging an outgoing laser beam from said output mirror; wherein said curvature of said full reflection mirror is varied according to change of temperature in said laser medium.

12. A laser apparatus according to claim 11; wherein said curvature of said full reflection mirror and said diameter of said aperture means are set so that a diameter of a beam incoming into said converging means is kept constant.

13. A laser apparatus according to claim 8; wherein said curvature of said full reflection mirror and said diameter of said aperture means are set so that converging characteristics of said converging means in the beam mode are kept constant.

14. A laser apparatus comprising:

an output mirror for reflecting a portion of a laser beam and transmitting therethrough a remaining portion thereof;

a full reflection mirror located at a position opposite to said output mirror for completely reflecting a laser beam and having a variable curvature;

a laser medium provided between said output mirror and said full reflection mirror which produces induced emission of radiation;

an aperture means for determining a beam mode of a laser beam generated between said output mirror and said full reflection mirror and having a variable aperture diameter; and a converging means for converging an outgoing laser beam from said output mirror and changing a distance from said output mirror according to a machining path; and a converging characteristics detecting means provided between said converging means and said output mirror; wherein said curvature of said full reflection mirror is varied and also said diameter of said aperture means is varied according to an output from said converging characteristics detecting means.

15. A laser apparatus according to claim 14; wherein said curvature of said full reflection mirror is varied according to a fluid pressure, a flow rate of which is controlled by a pressure sensor.

16. A laser apparatus according to claim 15; wherein a signal from the pressure sensor is controlled according to an input from outside.

17. A laser apparatus according to claim 15; wherein a light path pipe is provided between said output mirror and said converging means in a case where a fluid for varying a curvature of said full reflection mirror is a gas not absorbing a laser beam, and said fluid flows through said light path.

18. A laser apparatus comprising:

an output mirror for reflecting a portion of a laser beam, transmitting therethrough a remaining portion thereof;

a full reflection mirror located at a position opposite to said output mirror for completely reflecting a laser beam; and a laser medium provided between said output mirror and said full reflection mirror which produces induced emission of radiation; said laser apparatus outputting a laser beam from said output mirror; wherein a transmission mirror is located such that said laser beam goes through said transmission mirror immediately after the laser beam is output from said output mirror, and a means for changing a curvature of said transmission mirror.

19. A laser apparatus according to claim 18; wherein said transmission mirror is made from a material having at least one of a thickness thinner and the Young's modulus smaller than that of said output mirror, and the means for changing a curvature of said transmission mirror imparts a fluid pressure to a laser beam output side of said output mirror as well as to a laser beam input side of said transmission mirror.

20. A laser apparatus comprising:

an output mirror for reflecting a portion of a laser beam and transmitting therethrough a remaining portion thereof;

a full reflection mirror located at a position opposite to said output mirror for completely reflecting a laser beam; and a laser medium provided between said output mirror and said full reflection mirror which produces induced emission of radiation; said laser apparatus outputting a laser beam from said output mirror; wherein the transmission mirror is located so that a laser beam passes through said transmission mirror just after the laser beam is output from the output mirror, and a means for changing a curvature of said output mirror.

21. A laser apparatus according to claim 20; wherein a light path pipe is provided in a light path between the output mirror and, the converging means, and in a case where a fluid is a gas not absorbing a laser beam, a fluid for changing a curvature of said output mirror flows inside said light path.

22. A laser apparatus according to claim 20 comprising an aperture means for deciding a beam mode of a laser beam generated between the output mirror and the full reflection mirror and having a variable aperture diameter thereof; wherein a curvature of said output mirror is varied and also an aperture diameter of the aperture means is varied.

23. A laser apparatus according to claim 20; wherein a flow rate of a fluid is controlled by a pressure sensor and a fluid pressure is given thereto.

24. A laser apparatus comprising:

an output mirror for reflecting a portion of a laser beam and transmitting therethrough a remaining portion thereof;

a full reflection mirror located at a position opposite to said output mirror for completely reflecting a laser beam;

a laser medium provided between said output mirror and said full reflection mirror which produces induced emission of radiation; and a converging means for converging a laser beam outgoing from said output mirror and the distance from said output mirror changed according to a machining path; wherein a transmission mirror is located so that a laser beam passes through the transmission mirror just after it outputs from the output mirror, and a means for changing a curvature of said transmission mirror.

25. A laser apparatus according to claim 24; wherein the transmission mirror is made from a material with a thickness thinner or Young's medullas smaller than that of the output mirror, and said means for changing a curvature of the transmission mirror is provided so that a fluid pressure is provided to a laser beam output side of said outgoing mirror as well as to a laser beam incoming side of said transmission mirror.

26. A laser apparatus according to claim 25; wherein a light path pipe is provided in a light path between the output mirror and the converging means, and in a case where a fluid is a gas not absorbing a laser beam, a fluid for changing a curvature of said output mirror flows inside said light path.

27. A laser apparatus comprising:

an output mirror reflecting a portion of a laser beam and transmitting therethrough a remaining portion of the laser beam;

a full reflection mirror provided at a position opposite to the output mirror, reflecting all of the laser beam, and having a variable curvature;

a laser medium provided between said output mirror and said full reflection mirror for generating induced radiation;

a converging means for converging a laser beam outgoing from said output mirror onto a workpiece; and a means for changing a distance between said converging means and said workpiece.

28. A laser apparatus according to claim 27; wherein a distance between said converging means and said workpiece is changed by an absorption factor detecting means provided on the output mirror or the converging means and according to an output from said absorption factor detecting means.

29. A laser apparatus according to claim 27; wherein a distance between said converging means and said workpiece is changed by the converging characteristics detecting means between the output mirror and the converging means and according to an output from said converging characteristics detecting means.

* * * * *